US011100149B2

(12) United States Patent
Oda

(10) Patent No.: US 11,100,149 B2
(45) Date of Patent: Aug. 24, 2021

(54) SEARCH SUPPORT SYSTEM, SEARCH SUPPORT METHOD, AND SEARCH SUPPORT PROGRAM

(71) Applicant: Hitachi, Ltd., Tokyo (JP)

(72) Inventor: Takuya Oda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 454 days.

(21) Appl. No.: 16/217,085

(22) Filed: Dec. 12, 2018

(65) Prior Publication Data

US 2019/0197050 A1 Jun. 27, 2019

(30) Foreign Application Priority Data

Dec. 21, 2017 (JP) .............................. JP2017-245253

(51) Int. Cl.
*G06F 16/00* (2019.01)
*G06F 16/33* (2019.01)
*G06F 16/2452* (2019.01)
*G06F 40/247* (2020.01)

(52) U.S. Cl.
CPC .... *G06F 16/3344* (2019.01); *G06F 16/24522* (2019.01); *G06F 16/3338* (2019.01); *G06F 40/247* (2020.01)

(58) Field of Classification Search
CPC .............. G06F 16/3344; G06F 40/247; G06F 16/24522; G06F 16/3338
See application file for complete search history.

(56) References Cited

U.S. PATENT DOCUMENTS

| | | | | |
|---|---|---|---|---|
| 9,600,566 B2* | 3/2017 | Ganti | .................... | G06F 40/247 |
| 9,678,945 B2* | 6/2017 | Weiss | .................. | G06F 16/3329 |
| 2002/0156771 A1* | 10/2002 | Frieder | ............. | G06F 16/90332 |
| 2005/0267871 A1* | 12/2005 | Marchisio | ........... | G06F 16/3338 |
| 2008/0077570 A1* | 3/2008 | Tang | .................. | G06F 16/3346 |
| 2008/0275694 A1* | 11/2008 | Varone | .................... | G06F 40/30 |
| | | | | 704/9 |
| 2008/0301129 A1* | 12/2008 | Milward | ................. | G06F 16/31 |
| 2014/0040275 A1* | 2/2014 | Dang | .................. | G06F 16/2228 |
| | | | | 707/741 |
| 2015/0339290 A1* | 11/2015 | Mueller | .............. | G06F 16/3344 |
| | | | | 704/9 |

(Continued)

FOREIGN PATENT DOCUMENTS

WO 2014/002776 A1 1/2014

*Primary Examiner* — Jared M Bibbee
(74) *Attorney, Agent, or Firm* — Mattingly & Malur, PC

(57) ABSTRACT

A search support system supporting a search of unstructured data associated with a subject name that is a name of a subject indicated by a predetermined structure in structured data which contains a plurality of structures having a hierarchical relationship, is configured to include: a synonym search section that extracts a set of synonyms from teacher data which is unstructured data for detecting synonyms of the subject name; and an extended synonym generation section that generates an extended synonym which is a phrase obtained by combining a first subject name of a first structure in the structured data or a first synonym which is a synonym of the first subject name and which is extracted by the synonym search section with one or more second subject names indicated by one or more second structures higher in order than the first structure.

13 Claims, 24 Drawing Sheets

(56) References Cited

U.S. PATENT DOCUMENTS

2015/0339574 A1* 11/2015 Allen .................. G06F 16/2365
706/11
2016/0055155 A1* 2/2016 Allen .................. G06F 16/3331
707/749
2019/0163781 A1* 5/2019 Ackermann ........ G06F 16/9535

* cited by examiner

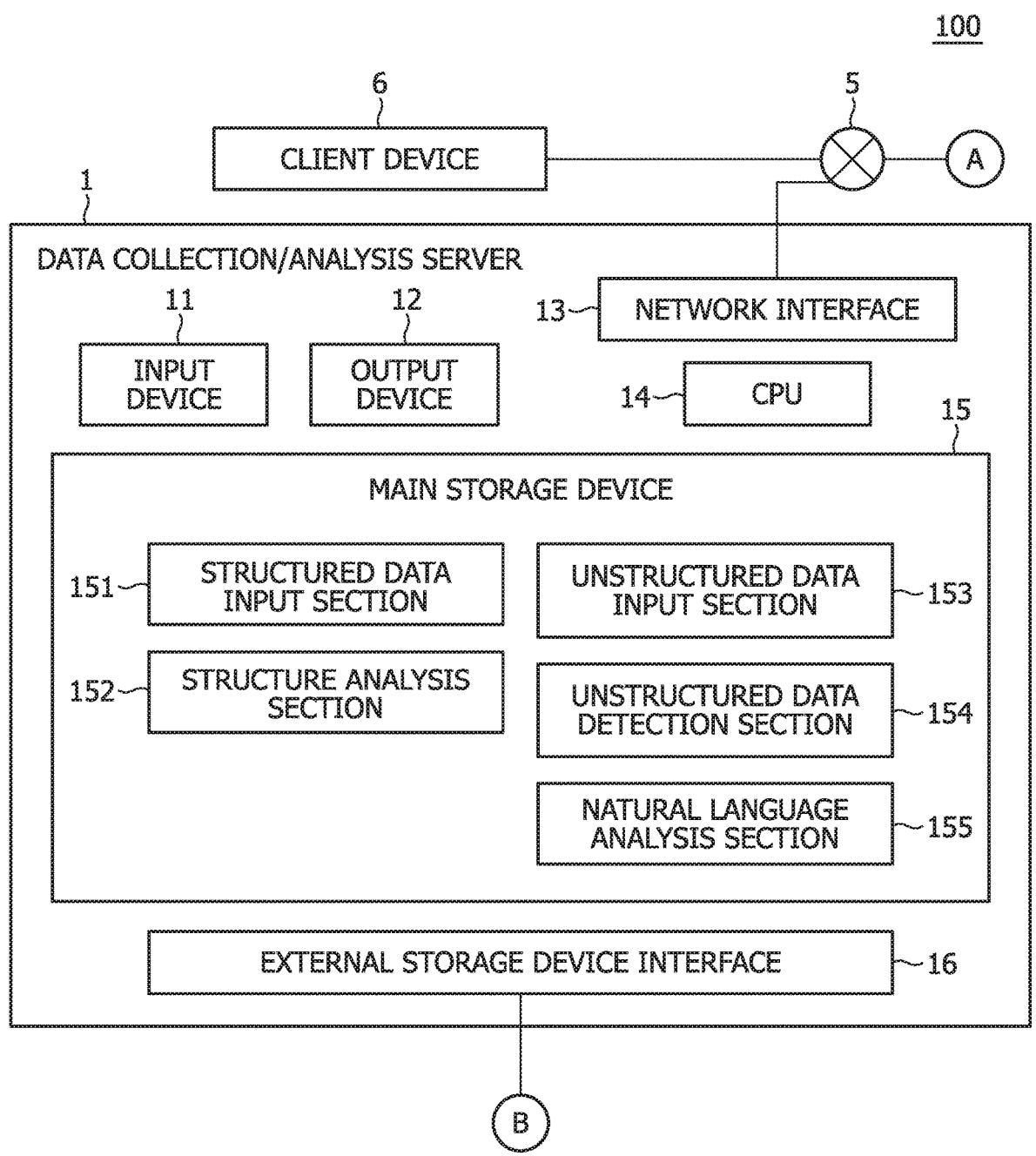

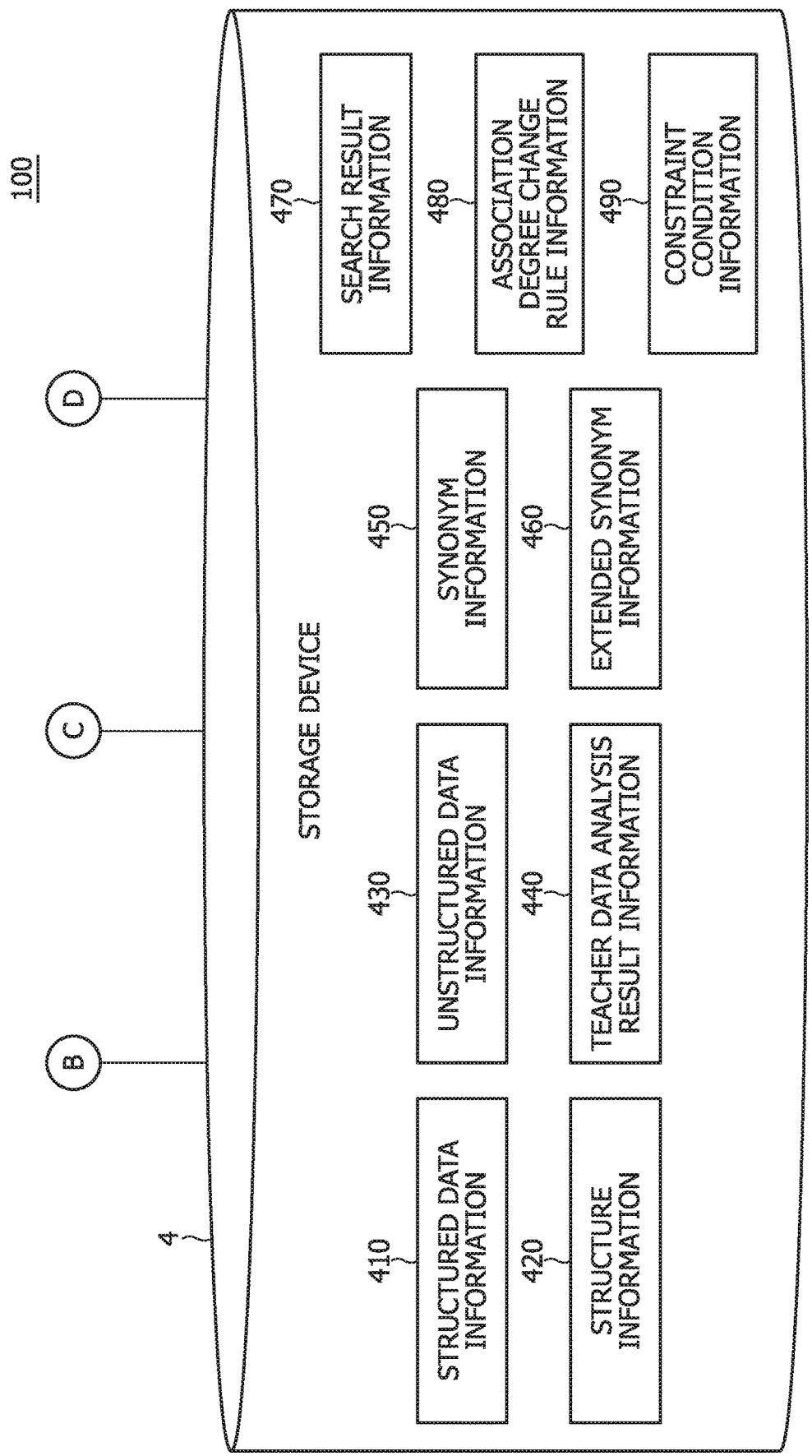

FIG. 3

| STRUCTURE ID | STRUCTURED DATA SOURCE ID | NAME | PARENT STRUCTURE ID |
|---|---|---|---|
| 1 | 1 | HOT ROLLING | Root |
| 2 | 1 | IRON AND STEEL | 1 |
| 3 | 1 | COPPER | 1 |
| 4 | 1 | ID | 2 |
| 5 | 1 | ROLLING TEMPERATURE (°C) | 2 |
| 6 | 1 | FLOW RATE (kg/s) | 2 |
| 7 | | | |

| UNSTRUCTURED DATA SOURCE ID | UNSTRUCTURED DATA | TYPE | USER NAME | PASSWORD | TEACHER FLAG |
|---|---|---|---|---|---|
| 1 | 192.168.0.100¥share¥training | file | user | pass | Yes |
| 2 | 192.168.0.101¥share¥target | file | share | share | No |
| 3 | 192.168.0.102¥share¥target | file | owner | pass | No |
| 4 | | | | | |

FIG. 5

| UNSTRUCTURED DATA SOURCE ID | PART OF SPEECH | DETAILED CLASSIFICATION | CONTENT |
|---|---|---|---|
| 1 | NOUN | PROPER NOUN (PERSON'S NAME) | MINORU TANAKA, KAZUKO SATO, SHIGERU SUZUKI, ... |
| 1 | NOUN | PROPER NOUN (COUNTRY NAME) | JAPAN, USA, CHINA, ... |
| 1 | NOUN | PROPER NOUN (PLACE NAME) | TOKYO, KANAGAWA, CHIBA, SAITAMA, ... |
| 1 | | | ... |
| 1 | NOUN | OTHERS (GENERAL NOUN) | IRON AND STEEL, FACILITIES, MANUFACTURING, LINE, METAL, OPERATOR, ... |
| 1 | | | ... |
| 1 | PARTICLE | CASE PARTICLE | NO, NI, WO, KARA, YORI, DE, E, YA, ... |
| 1 | PARTICLE | CONJUNCTIVE PARTICLE | BA, TO, TEMO, KEREDO, NODE, KARA, SHI, ... |
| | | | ... |

| SYNONYM ID | CONTENT | ASSOCIATED SYNONYM ID | PART OF SPEECH | DETAILED CLASSIFICATION |
|---|---|---|---|---|
| 1 | IRON | - | NOUN | COMMON NOUN |
| 2 | HOT ROLLING MANUFACTURING | - | NOUN | COMMON NOUN |
| 3 | ROLLING MILL | - | NOUN | COMMON NOUN |
| 4 | TEMPERATURE | - | NOUN | COMMON NOUN |
| 5 | NO, KARA, YORI, … | - | PARTICLE | CASE PARTICLE |
| 6 | IRON AND STEEL, STEEL, … | 1 | - | - |
| 7 | HOT STRETCHING MANUFACTURING, HOT STRETCHING, ROLLING, … | 2 | - | - |
| 8 | ROLLING FACILITY, SLAB | 3 | - | - |
| 9 | ROLLING TEMPERATURE, HEATING, … | 4 | - | - |
| 10 | NIOKERU, DEWA, … | 5 | - | - |
| 11 | | | | |

FIG. 7

| EXTENDED SYNONYM ID | TO-BE-SEARCHED STRUCTURED DATA STRUCTURE ID | EXTENDED SYNONYM | PRIORITY |
|---|---|---|---|
| 1 | 2 | "IRON TEMPERATURE WITHIN HOT ROLLING MILL" | 1 |
| 2 | 2 | "SLAB TEMPERATURE DURING IRON AND STEEL HOT STRETCHING" | 2 |
| 3 | 2 | "IRON HOT ROLLING" & "SLAB TEMPERATURE" | 3 |
| 4 | ... | | |

FIG. 8

| SEARCH ID 471 | SEARCH KEYWORD ID (= EXTENDED SYNONYM ID) 472 | SEARCH HIT COUNT 473 | SEARCH HIT UNSTRUCTURED DATA SOURCE ID 474 | SEARCH HIT PAGE 475 | SEARCH HIT UNSTRUCTURED DATA 476 | ASSOCIATION DEGREE 477 |
|---|---|---|---|---|---|---|
| 1 | 1 | 0 | - | - | - | - |
| 2 | 2 | 2 | 3 | 12-13 | FIG. 1 ILLUSTRATES A CHANGE OF SLAB TEMPERATURE AND A FLOW RATE DURING IRON AND STEEL HOT STRETCHING AS A GRAPH. | 0.5 |
| 2 | 2 | 2 | 4 | 15 | AS A RESULT OF OPTIMIZING SLAB TEMPERATURE DURING IRON AND STEEL HOT STRETCHING... | 0.5 |
| 3 | 3 | 10 | 4 | 23 | TO INVESTIGATE THE RELATIONSHIP BETWEEN TEMPERATURE CHANGE AND THE FLOW RATE DURING IRON HOT ROLLING, TEMPERATURE SENSORS WERE INSTALLED IN MANY LOCATIONS IN THE MILL. AS A RESULT, AS FOR TEMPERATURE CHANGE OF SLAB, IN PARTICULAR ... | 0.5 |
| 3 | 3 | 10 | 5 | 18 | ... | 0.5 |
| 3 | 3 | 10 | 8 | 33 | ... | 0.5 |
| 3 | ... | | | | | |

| RULE ID 481 | APPLICABILITY FLAG 482 | CONDITION 483 | ACTION 484 | PARAMETER 1 485 | PARAMETER 2 486 |
|---|---|---|---|---|---|
| 1 | Yes | SEARCH KEYWORDS ARE ALL IN CAPTION OF SINGLE CHART. | RAISE ASSOCIATION DEGREE BY "PARAMETER 1" | 0.5 / CHART HIT COUNT | - |
| 2 | No | SEARCH KEYWORDS ARE ALL DESCRIBED IN THE SAME SENTENCE. | RAISE ASSOCIATION DEGREE BY "PARAMETER 1" | 0.5 / SENTENCE HIT COUNT | - |
| 3 | No | | | | |

| STRUCTURE ID | STRUCTURED DATA SOURCE ID | DATA TYPE | CONSTRAINT CONDITION |
|---|---|---|---|
| 1 | 1 | TABLE | - |
| 2 | 1 | COLUMN | - |
| 3 | 1 | COLUMN | - |
| 4 | 1 | INTEGER | - |
| 5 | 1 | REAL NUMBER | >1200 |
| 6 | 1 | REAL NUMBER | <10 |
| 7 | | | |

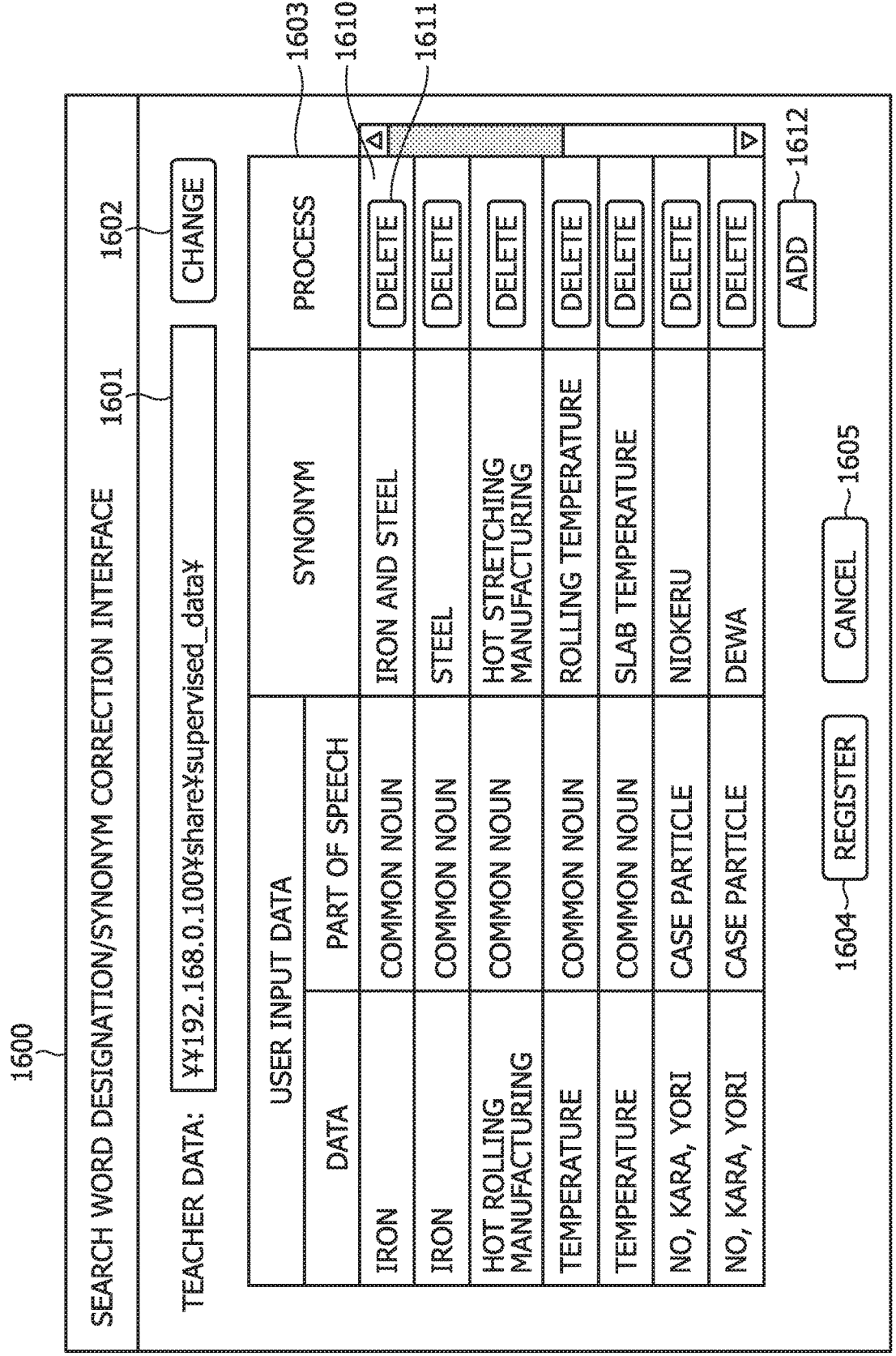

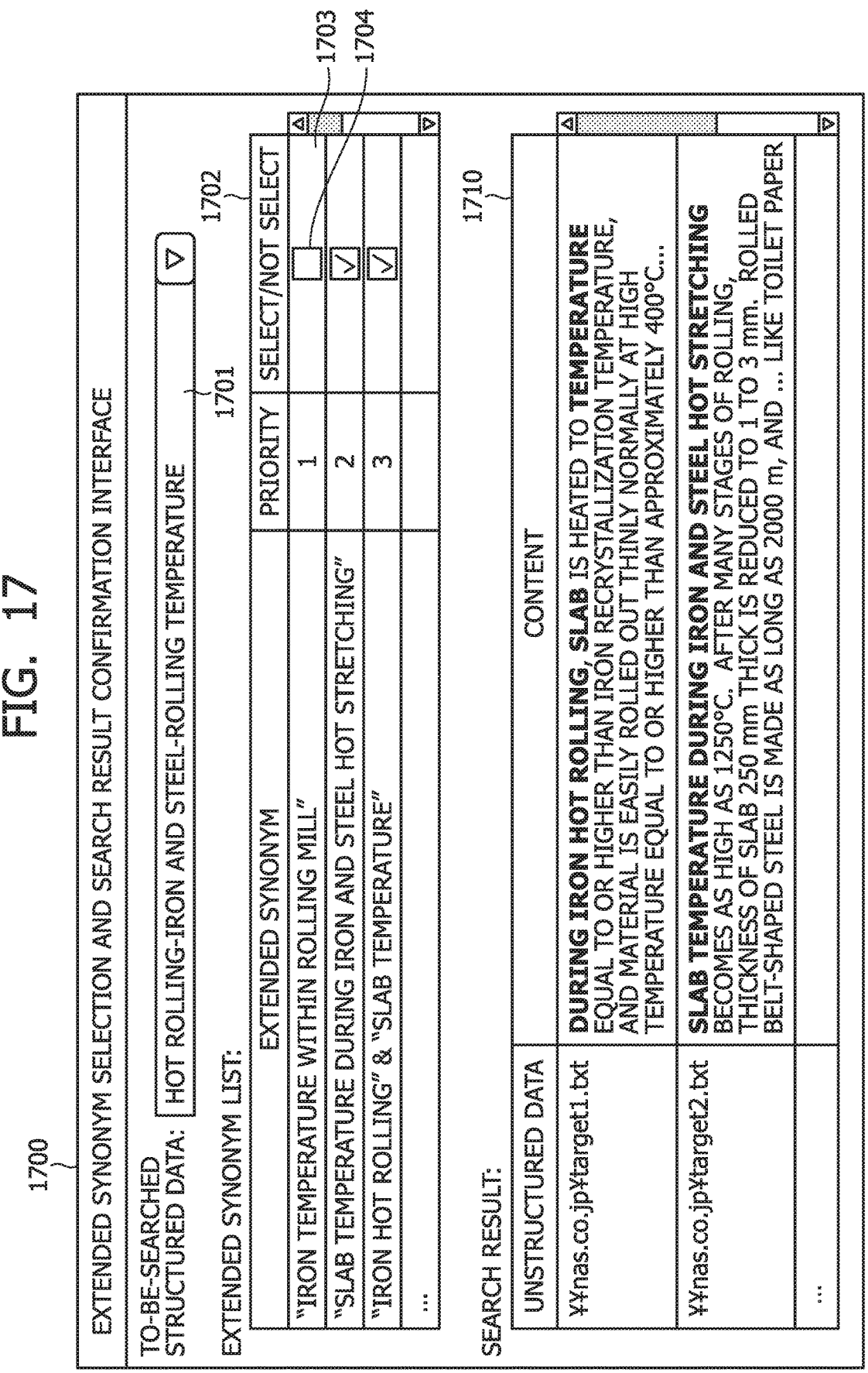

FIG. 18B

SEARCH RESULT:

| UNSTRUCTURED DATA | CONTENT | ASSOCIATION DEGREE |
|---|---|---|
| ¥¥nas.co.jp¥target1.txt | HOT ROLLING PROCEDURES DEPICTED IN THIS FIGURE ARE GIVEN AS AN EXAMPLE ONLY. NORMALLY, SLAB IS HEATED TO TEMPERATURE EQUAL TO OR HIGHER THAN IRON AND STEEL RECRYSTALLIZATION TEMPERATURE, AND MATERIAL CAN BE EASILY ROLLED OUT THINLY NORMALLY AT ROLLING TEMPERATURE EQUAL TO OR HIGHER THAN APPROXIMATELY 400°C. | 0.96 |
| ¥¥nas.co.jp¥target2.txt | ABOVE FIGURE SIMPLY ILLUSTRATES ROLLING PROCEDURES. AFTER MANY STAGES OF ROLLING, THICKNESS OF SLAB 250 mm THICK IS REDUCED TO 1 TO 3 mm. ROLLED BELT-SHAPED IRON AND STEEL IS MADE AS LONG AS 2000 m, AND ROLLED UP INTO ROLL LIKE TOILET PAPER. | 0.61 |

SEARCH SUPPORT SYSTEM, SEARCH SUPPORT METHOD, AND SEARCH SUPPORT PROGRAM

CROSS-REFERENCE TO RELATED APPLICATION

The present application claims priority from Japanese application JP 2017-245253, filed on Dec. 21, 2017, the contents of which is hereby incorporated by reference into this application.

FIELD OF THE INVENTION

The present invention relates to a search support system and the like for supporting an unstructured data search.

BACKGROUND OF THE INVENTION

Conventionally, a search system can search data corresponding to a keyword for a search by inputting the keyword. It is important to determine what type of keyword is to be input for obtaining desired data.

Some search systems search data using not only the input keyword but also a synonym of the input keyword. As a technique for extracting a synonym, those described in, for example, International Publication No. WO2014/002776 and U.S. Pat. No. 9,678,945 are known.

SUMMARY OF THE INVENTION

For example, in a case of doing a search using a synonym of a keyword, there is a probability of hits of many pieces of non-associated data by the search.

The present invention has been achieved in the light of the circumstances described above and an object of the present invention is to provide a technique capable of appropriately searching unstructured data.

To attain the object, a search support system according to one aspect is a search support system supporting a search of unstructured data associated with a subject name that is a name of a subject indicated by a predetermined structure in structured data which contains a plurality of structures having a hierarchical relationship, including: a synonym extraction section that extracts a set of synonyms from teacher data which is unstructured data for detecting synonyms of the subject name; and an extended synonym generation section that generates an extended synonym which is a phrase obtained by combining a first subject name of a first structure in the structured data or a first synonym which is a synonym of the first subject name and which is extracted by the synonym extraction section with one or more second subject names indicated by one or more second structures higher in order than the first structure or second synonyms which are synonyms of the one or more second subject names and which are extracted by the synonym extraction section, and that stores the extended synonym in a predetermined extended synonym storage section.

According to the present invention, it is possible to appropriately search unstructured data.

BRIEF DESCRIPTION OF THE DRAWINGS

FIGS. 1A-1C are overall configuration diagrams of a search support system according to one embodiment;

FIG. 3 is a configuration diagram of a structure information table according to the embodiment;

FIG. 5 is a configuration diagram of a teacher data analysis result information table according to the embodiment;

FIG. 6 is a configuration diagram of a synonym information table according to the embodiment;

FIG. 7 is a configuration diagram of an extended synonym information table according to the embodiment;

FIG. 8 is a configuration diagram of a search result information table according to the embodiment;

FIG. 9 is a configuration diagram of an association degree change rule information table according to the embodiment;

FIG. 10 is a configuration diagram of a constraint condition information table according to the embodiment;

FIG. 16 depicts a search word designation/synonym correction interface screen according to the embodiment;

FIG. 17 depicts an extended synonym selection and search result confirmation interface screen according to the embodiment; and FIGS. 18A-18B depict an association degree change rule correction interface screen according to the embodiments.

DESCRIPTION OF THE PREFERRED EMBODIMENTS

Embodiments of the present invention will be described hereinafter with reference to the drawings. It is noted that an embodiment described hereinafter is not intended to limit the invention defined by claims, and that all of elements described in the embodiment and combinations thereof are not always essential to attaining the object of the invention.

In the following description, information is often described using an expression such as "AAA table"; however, the information may be expressed in any data structure. In other words, to indicate that information does not depend on a data structure, "AAA table" can be rephrased as "AAA information."

Figure 1B:
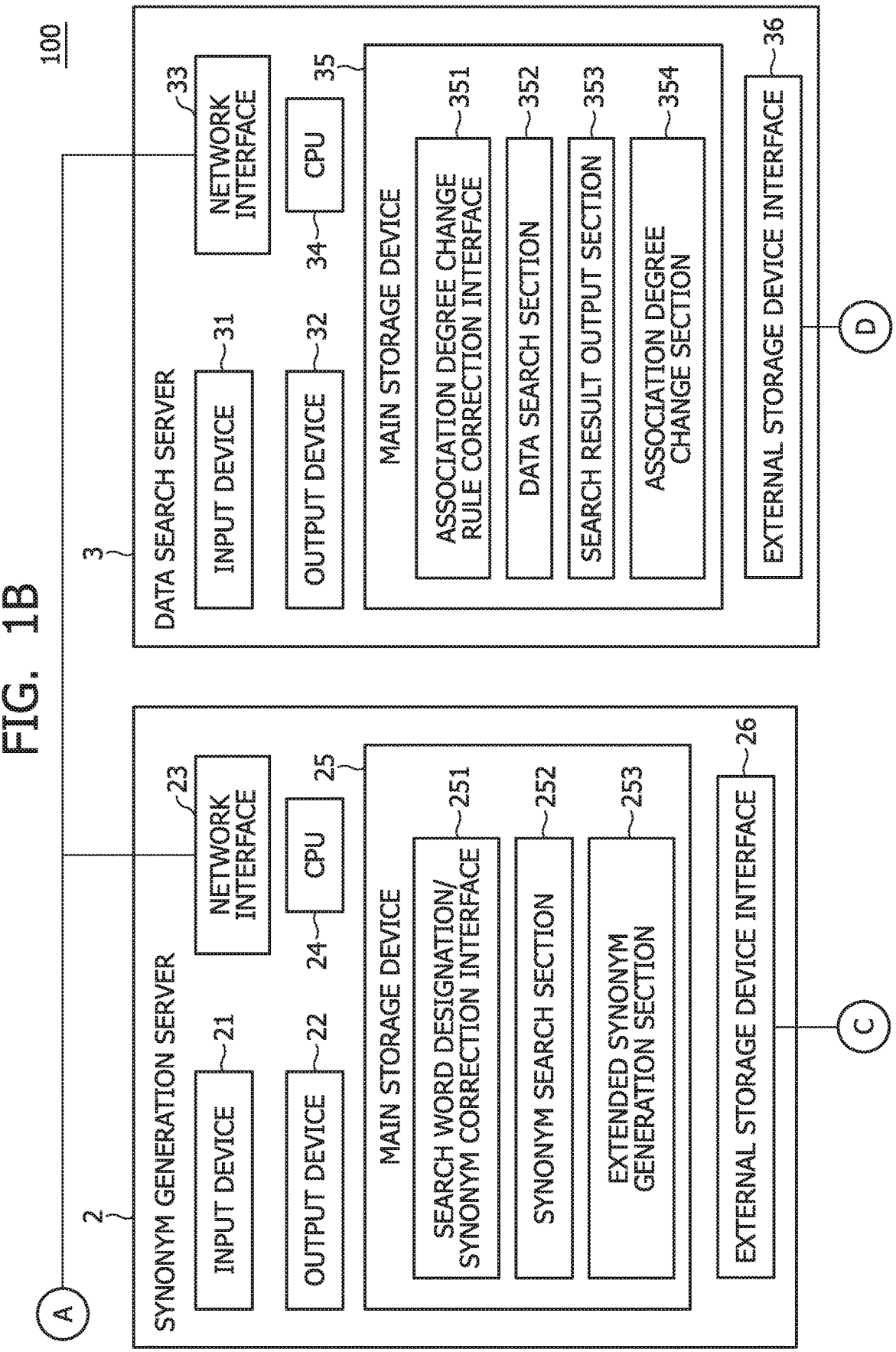

FIGS. 1A-1C are overall configuration diagrams of a search support system according to one embodiment.

A search support system 100 includes a data collection/analysis server 1, a synonym generation server 2, a data search server 3, a storage device 4, and a client device 6. The data collection/analysis server 1, the synonym generation server 2, the data search server 3, and the client device 6 are communicably connected to one another via a network 5. In addition, the data collection/analysis server 1, the synonym generation server 2, and the data search server 3 are connected to the storage device 4. The data collection/analysis server 1, the synonym generation server 2, and the data search server 3 may be configured with different physical computing machines. Alternatively, at least any one of the data collection/analysis server 1, the synonym generation server 2, and the data search server 3 may be configured with a virtual computing machine.

The data collection/analysis server 1 is a server that executes processes for collecting and analyzing structured data and unstructured data. The data collection/analysis server 1 includes an input device 11, an output device 12, a network interface 13, a CPU (Central Processing Unit) 14 that is an example of a processor, a main storage device 15, and an external storage device interface 16.

The input device 11 is, for example, a mouse and a keyboard, and receives an operation input by an administrator of the data collection/analysis server 1. The output device 12 is, for example, a display device such as a liquid crystal display device, and displays and outputs various kinds of information. The network interface 13 transmits and receives data to and from other devices (such as the synonym generation server 2, the data search server 3, and the client device 6) connected to the data collection/analysis server 1 via the network 5. The external storage device interface 16 transmits and receives data to and from the storage device 4 connected to the data collection/analysis server 1 from outside.

The CPU 14 executes various processes by executing programs stored in the main storage device 15. The main storage device 15 is, for example, a RAM (Random Access Memory) or a ROM (Read Only Memory), and stores the programs (such as a processing program) executed by the CPU 14 and various kinds of information. The main storage device 15 stores one or more programs that configure functional sections such as a structured data input section 151, a structure analysis section 152, an unstructured data input section 153, an unstructured data detection section 154, and a natural language analysis section 155 by being executed by the CPU 14. In FIGS. 1A-1C, the functional sections are denoted within the main storage device 15 for the sake of convenience. Operations of these functional sections will be described later.

The synonym generation server 2 is a server that executes processes for searching synonyms and generating an extended synonym to be described later. The synonym generation server 2 includes an input device 21, an output device 22, a network interface 23, a CPU 24 that is an example of a processor, a main storage device 25, and an external storage device interface 26.

The input device 21 is, for example, a mouse and a keyboard, and receives an operation input by an administrator of the synonym generation server 2. The output device 22 is, for example, a display device such as a liquid crystal display device, and displays and outputs various kinds of information. The network interface 23 transmits and receives data to and from other devices (such as the data collection/analysis server 1, the data search server 3, and the client device 6) connected to the synonym generation server 2 via the network 5. The external storage device interface 16 transmits and receives data to and from the storage device 4 connected to the synonym generation server 2 from outside.

The CPU 24 executes various processes by executing programs stored in the main storage device 25. The main storage device 25 is, for example, a RAM or a ROM, and stores the programs (such as a processing program) executed by the CPU 24 and various kinds of information. The main storage device 25 stores one or more programs that configure functional sections such as a search word designation/synonym correction interface 251 that causes a search word designation/synonym correction interface screen 1600 (refer to FIG. 16) to be displayed on, for example, the client device 6, a synonym search section 252, and an extended synonym generation section 253 by being executed by the CPU 24. In FIGS. 1A-1C, the functional sections are denoted within the main storage device 25 for the sake of convenience. Operations of these functional sections will be described later.

The data search server 3 is a server that executes processes for searching data. The data search server 3 includes an input device 31, an output device 32, a network interface 33, a CPU 34 that is an example of a processor, a main storage device 35, and an external storage device interface 36.

The input device 31 is, for example, a mouse and a keyboard, and receives an operation input by an administrator of the data search server 3. The output device 32 is, for example, a display device such as a liquid crystal display device, and displays and outputs various kinds of information. The network interface 33 transmits and receives data to and from other devices (such as the data collection/analysis server 1, the synonym generation server 2, and the client device 6) connected to the data search server 3 via the network 5. The external storage device interface 36 transmits and receives data to and from the storage device 4 connected to the data search server 3 from outside.

The CPU 34 executes various processes by executing programs stored in the main storage device 35. The main storage device 35 is, for example, a RAM or a ROM, and stores the programs (such as a processing program) executed by the CPU 34 and various kinds of information. The main storage device 35 stores one or more programs that configure functional sections such as an association degree change rule correction interface 351 that causes an association degree change rule correction interface screen 1800 (refer to FIGS. 18A-18B) to be displayed on, for example, the client device 6, a data search section 352 that is an example of a search section, a search result output section 353, and an association degree change section 354 by being executed by the CPU 34. In FIGS. 1A-1C, the functional sections are denoted within the main storage device 35 for the sake of convenience. Operations of these functional sections will be described later.

The storage device 4 stores various kinds of information used in the data collection/analysis server 1, the synonym generation server 2, and the data search server 3. The storage device 4 stores a structured data information table 410, a structure information table 420, an unstructured data information table 430, a teacher data analysis result information table 440, a synonym information table 450, an extended synonym information table 460, a search result information table 470, an association degree change rule information table 480, and a constraint condition information table 490. The storage device 4 is an example of an extended synonym storage section, a rule storage section, and a constraint condition storage section.

Details of the tables stored in the storage device 4 will next be described.

Figure 2:
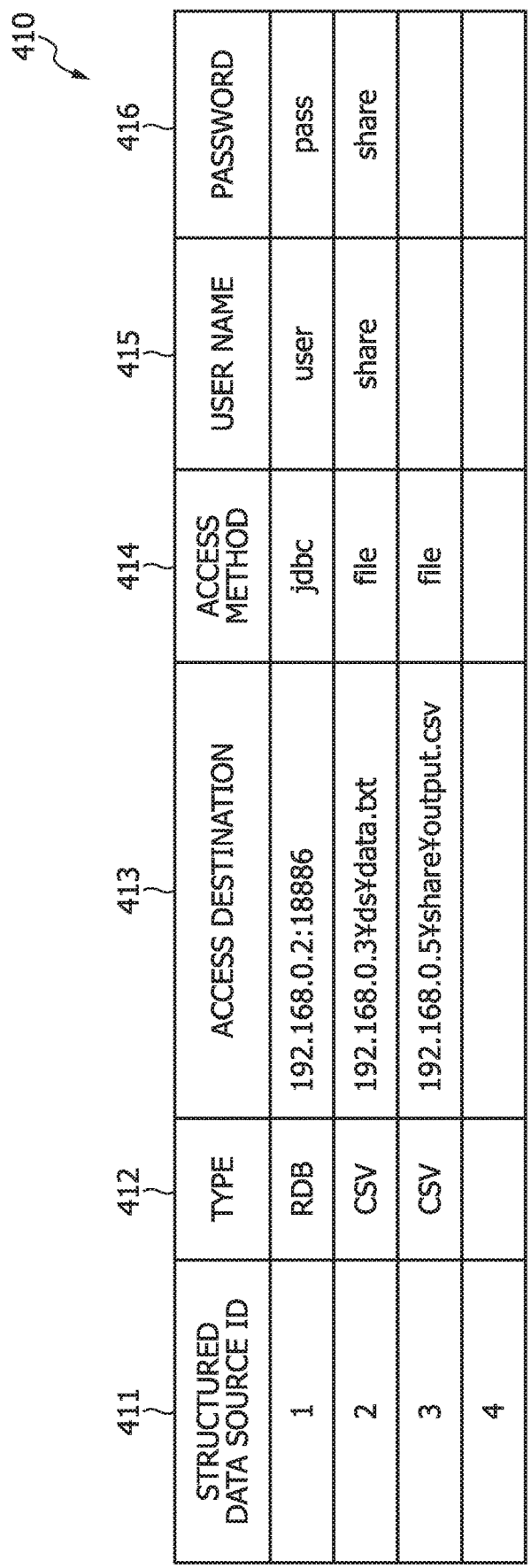
FIG. 2 is a configuration diagram of a structured data information table according to the embodiment.

FIG. 2 is a configuration diagram of the structured data information table according to the embodiment.

The structured data information table 410 is a table for managing structured data and has an entry per structured data. The structured data information table 410 has a structured data source ID 411 column, a type 412 column, an access destination 413 column, an access method 414 column, a user name 415 column, and a password 416 column per entry.

An ID (identification information) of a structured data source corresponding to each entry is stored in the structured data source ID 411 column. A type of structured data corresponding to the entry is stored in the type 412 column. Examples of the type include "RDB" indicating that structured data is RDB (Relational Database) data and "CSV" indicating that structured data is data in a CSV (Comma-Separated Values) format.

Position information (for example, a URL (Uniform Resource Locator)) indicating a storage location of the structured data is stored in the access destination 413 column. A method of accessing the structured data is stored in the access method 414 column. User information (such as a user name) indicating a user accessible to the structured data is stored in the user name 415 column. For example, as the user information, a user name of the accessible user is stored in a case in which only a specific user is accessible, and "Share" indicating that an arbitrary user is accessible is stored in a case in which an arbitrary user is accessible. A password for accessing the structured data is stored in the password 416 column. It is noted that in a case of no need to use a password for accessing the structured data, "Share" indicating that effect is stored in the password 416 column.

FIG. 3 is a configuration diagram of the structure information table according to the embodiment.

The structure information table 420 is a table for managing a structure of each structured data and has an entry per structure of the structured data. Examples of the structure include a table and a column in a case in which the structured data is RDB data. The structure information table 420 has a structure ID 421 column, a structured data source ID 422 column, a name 423 column, and a parent structure ID 424 column per entry.

An ID (structure ID) indicating a structure corresponding to each entry is stored in the structure ID 421 column. An ID of a structured data source containing the structure corresponding to the entry is stored in the structured data source ID 422 column. A name of a subject (subject name) indicated by the structure corresponding to the entry is stored in the name 423 column. A structure ID of a structure that serves as a parent of the structure corresponding to the entry is stored in the parent structure ID 424 column. It is noted that "Root" indicating a root is stored in the parent structure ID 424 column in a case in which the structure corresponding to the entry is a top structure (Root) of the structured data.

Figure 4:
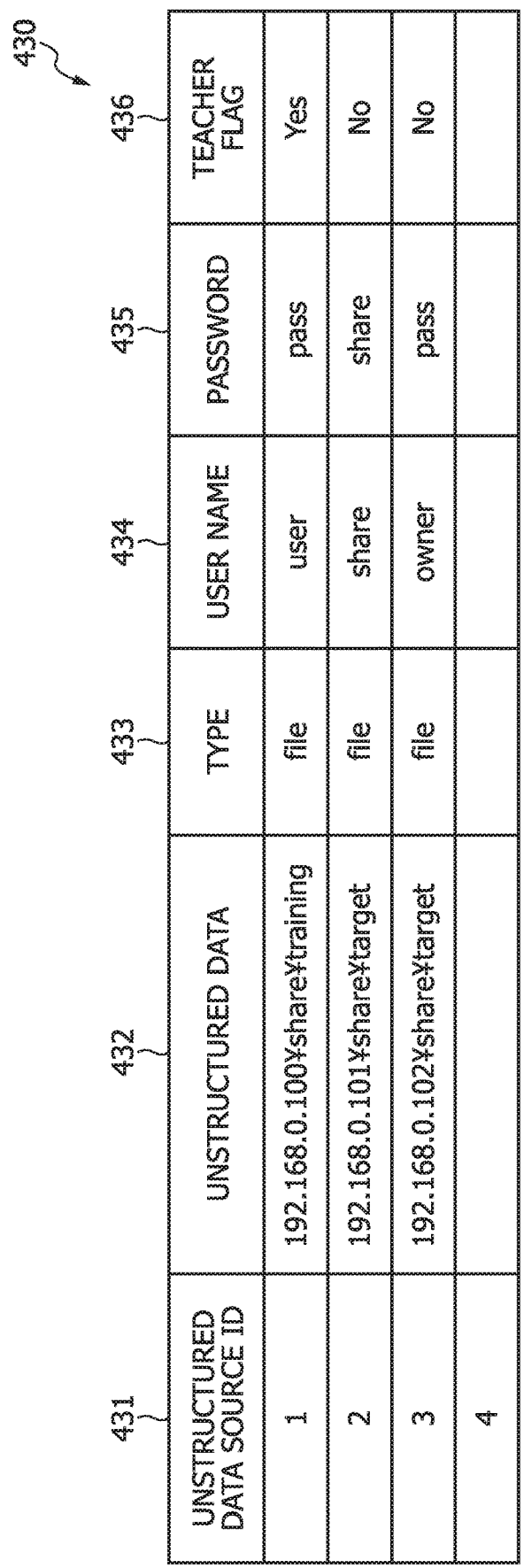
FIG. 4 is a configuration diagram of an unstructured data information table according to the embodiment.

FIG. 4 is a configuration diagram of the unstructured data information table according to the embodiment.

The unstructured data information table 430 is a table for managing unstructured data and has an entry per unstructured data. The unstructured data information table 430 has an unstructured data source ID 431 column, an unstructured data 432 column, a type 433 column, a user name 434 column, a password 435 column, and a teacher flag 436 column per entry.

An ID of an unstructured data source (unstructured data source ID) corresponding to each entry is stored in the unstructured data source ID 431 column. Position information (for example, a URL) indicating a storage location where the unstructured data corresponding to the entry is stored is stored in the unstructured data 432 column. A type of the unstructured data corresponding to the entry is stored in the type 433 column.

User information (such as a user name) indicating a user accessible to the unstructured data is stored in the user name 434 column. For example, as the user information, a user name of the accessible user is stored in a case in which only a specific user is accessible, and "Share" indicating that an arbitrary user is accessible is stored in a case in which an arbitrary user is accessible. A password for accessing the unstructured data is stored in the password 435 column. It is noted that in a case of no need to use a password for accessing the unstructured data, "Share" indicating that effect is stored in the password 435 column. A flag (teacher flag) indicating whether or not to use the unstructured data corresponding to the entry as teacher data to be described later is stored in the teacher flag 436 column. In the present embodiment, "Yes" is stored in the teacher flag 436 column in a case of using the unstructured data as the teacher data and "No" is stored therein in a case of not using the unstructured data as the teacher data.

FIG. 5 is a configuration diagram of the teacher data analysis result information table according to the embodiment.

The teacher data analysis result information table 440 is a table for managing results of analyzing teacher data. The teacher data analysis result information table 440 has an unstructured data source ID 441 column, a part of speech 442 column, a detailed classification 443 column, and a content 444 column per entry.

An unstructured data source ID of unstructured data indicating analyzed teacher data corresponding to each entry is stored in the unstructured data source ID 441 column. A name of a part of speech of a morpheme obtained by an analysis of the teacher data is stored in the part of speech 442 column. A detailed classification of the part of speech of the morpheme obtained by the analysis is stored in the detailed classification 443 column. Morphemes within the teacher data corresponding to the entry are stored in the content 444 column.

FIG. 6 is a configuration diagram of the synonym information table according to the embodiment.

The synonym information table 450 is a table for managing synonyms. The synonym information table 450 has a synonym ID 451 column, a content 452 column, an associated synonym ID 453 column, a part of speech 454 column, and a detailed classification 455 column per entry.

An ID (synonym ID) of a word corresponding to each entry is stored in the synonym ID 451 column. The word corresponding to the entry is stored in the content 452 column. A synonym ID of a synonym of the word corresponding to the entry is stored in the associated synonym ID 453 column. A part of speech of the word corresponding to the entry is stored in the part of speech 454 column. A classification of the part of speech of the word corresponding to the entry is stored in the detailed classification 455 column. In the present embodiment, as depicted in FIG. 6, for example, entries with the synonym IDs 1 to 5 correspond to words obtained from one teacher data, while entries with the synonym ID 6 and the following IDs correspond to words extracted from other teacher data as synonyms corresponding to the words in the entries with the synonym IDs 1 to 5.

FIG. 7 is a configuration diagram of the extended synonym information table according to the embodiment.

The extended synonym information table 460 is a table for managing extended synonyms. An extended synonym means herein a phrase obtained by combining names of subjects indicated by a plurality of structures having a hierarchical relationship in the structured data or synonyms of the names by a sign of an AND condition or a word having a meaning of "belonging." Using such an extended synonym makes it possible to obtain search result in the light of the hierarchical relationship among the structures in the structured data to be searched; thus, it is possible to obtain search results with higher accuracy than those obtained in a case of searching the structured data to be searched using only the names of the structures. The extended synonym information table 460 has an extended synonym ID 461 column, a to-be-searched structured data structure ID 462 column, an extended synonym 463 column, and a priority 464 column per entry.

An ID (extended synonym ID) of an extended synonym corresponding to each entry is stored in the extended synonym ID 461 column. A structure ID of structured data to be searched (to-be-searched structured data) is stored in the to-be-searched structured data structure ID 462 column. An extended synonym corresponding to the entry is stored in the extended synonym 463 column. A priority of the extended synonym corresponding to the entry is stored in the priority 464 column.

FIG. 8 is a configuration diagram of the search result information table according to the embodiment.

The search result information table 470 is a table for managing search results. The search result information table 470 has a search ID 471 column, a search keyword ID 472 column, a search hit count 473 column, a search hit unstructured data source ID 474 column, a search hit page 475 column, a search hit unstructured data 476 column, and an association degree 477 column per entry.

An ID (search ID) corresponding to a search corresponding to each entry is stored in the search ID 471 column. An ID (search keyword ID) of a search keyword used at a time of the search corresponding to the entry is stored in the search keyword ID 472 column. In the present embodiment, the search keyword is an extended synonym registered in the extended synonym information table 460 of FIG. 7; thus, the search keyword ID is equal to the extended synonym ID. The number of unstructured data sources that are search hits is stored in the search hit count 473 column. A source ID (unstructured data source ID) of an unstructured data that is a search hit is stored in the search hit unstructured data source ID 474 column. A page or a page range containing the search keyword of the unstructured data that is the search hit is stored in the search hit page 475 column. A content (sentences) of the range containing the search keyword of the unstructured data that is the search hit is stored in the search hit unstructured data 476 column. It is noted that, in the present embodiment, a part matching the search keyword in the unstructured data is stored in such a manner as to indicate matching (for example, manner of underlining the part). An association degree indicating an association of the unstructured data obtained by the search with the search keyword is stored in the association degree 477 column.

FIG. 9 is a configuration diagram of the association degree change rule information table according to the embodiment.

The association degree change rule information table 480 is a table for managing a rule (association degree rule) for changing each association degree and has an entry per rule. The association degree change rule information table 480 has a rule ID 481 column, an applicability flag 482 column, a condition 483 column, an action 484 column, a parameter 1 485 column, and a parameter 2 486 column per entry.

An ID (rule ID) of a rule corresponding to each entry is stored in the rule ID 481 column. A flag (applicability flag) as to whether or not to apply the rule is stored in the applicability flag 482 column. A condition for executing an action under the rule corresponding to the entry is stored in the condition 483 column. The action taken on the association degree in a case of satisfying the condition corresponding to the entry is stored in the action 484 column. A content of a parameter used in the action stored in the action 484 column is stored in each of the parameter 1 485 and parameter 2 486 columns.

For example, an entry in a first row of the association degree change rule information table 480 indicates the following respects. Since the rule ID is "1" and the applicability flag is "Yes," the rule is applicable. The condition is that search keywords are all in a caption of a single chart. In a case of satisfying the condition, the action of raising an association degree by a value set to a "parameter 1" is performed and the "parameter 1" is 0.5/(chart hit count). Here, the value obtained by dividing a constant by the number of hits (the number of charts herein) is set as the parameter for the following reasons. It is considered that the smaller number of hits is more effective as a search result, and a higher priority can be given in such a case.

Each rule registered in the association degree change rule information table 480 may be, for example, a rule for taking an action of raising the association degree on condition that the number of numeric values satisfying a constraint condition regarding a value of the structure to be described later is equal to or greater than a predetermined value. Using such a rule makes it possible to increase the association degree regarding unstructured data containing a content considered to be more associated with a content indicated by the structure.

FIG. 10 is a configuration diagram of the constraint condition information table according to the embodiment.

The constraint condition information table 490 is a table for managing constraint conditions for the value of a structure (data) in the structured data, and has an entry per structure. The constraint condition information table 490 has a structure ID 491 column, a structured data source ID 492 column, a data type 493 column, and a constraint condition 494 column per entry.

A structure ID of a structure corresponding to each entry is stored in the structure ID 491 column. A structured data source ID of structured data containing the structure corresponding to the entry is stored in the structured data source ID 492 column. A data type of data stored in the structure corresponding to the entry is stored in the data type 493 column. A constraint condition for the data stored in the structure corresponding to the entry is stored in the constraint condition 494 column.

For example, an entry in a sixth row of FIG. 10 (entry with the structure ID of "6" in the structure ID 491 column) indicates the following respects. The structure ID of the structure is "6," the structured data source ID of structured data containing the structure is "1," the data type of data stored in the structure is a real number, and the constraint condition for the value of the structure is "<10" (less than 10).

Operations performed by the search support system according to the embodiment will next be described.

An extended synonym information generation process will first be described.

Figure 11:
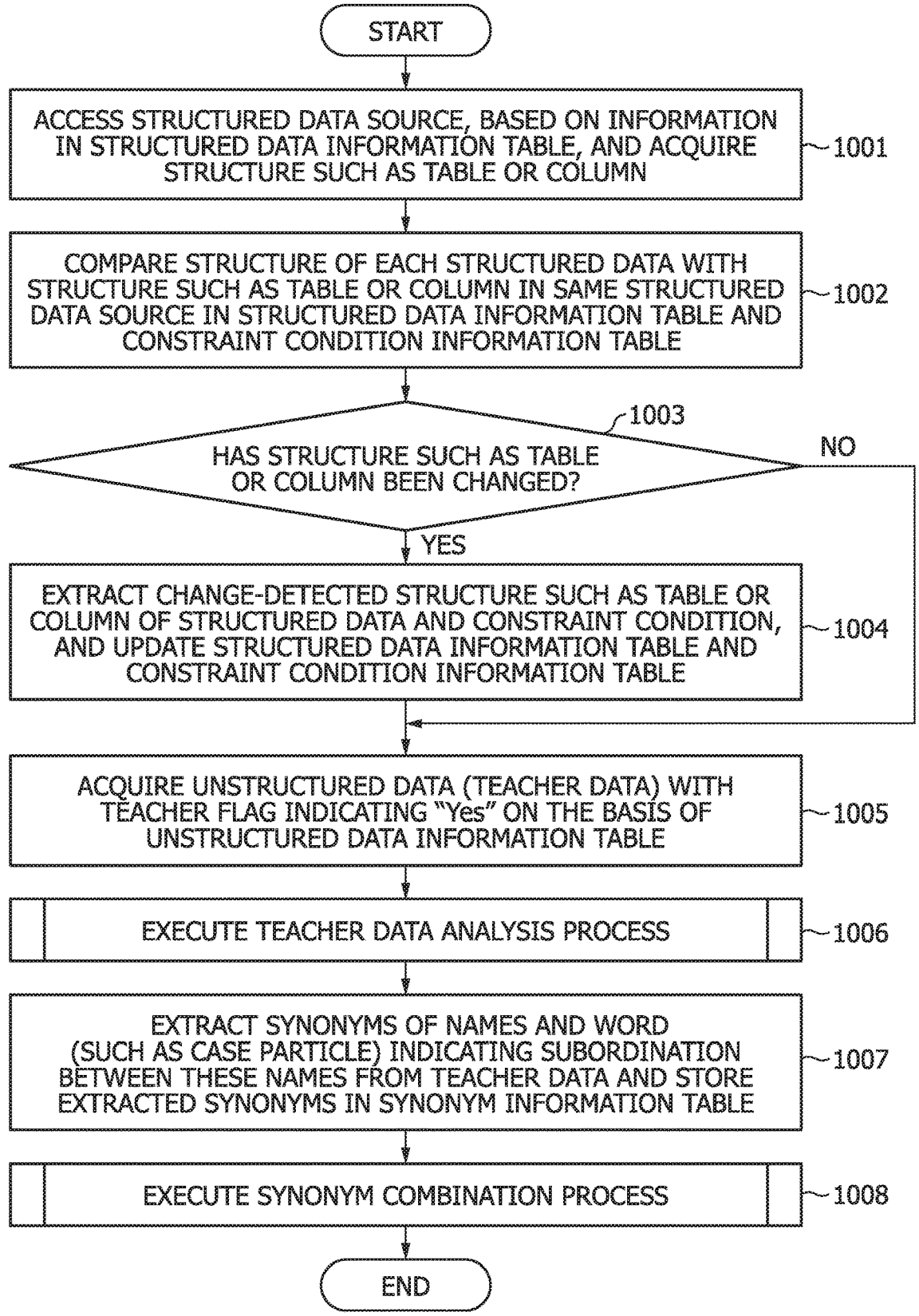
FIG. 11 is a flowchart of an extended synonym information generation process according to the embodiment.

FIG. 11 is a flowchart of the extended synonym information generation process according to the embodiment.

The extended synonym information generation process is executed at least once before a search process, to be described later, is executed. The extended synonym information generation process may be executed, for example, at regular intervals.

First, the structured data input section 151 of the data collection/analysis server 1 refers to the structured data information table 410, accesses a source of each structured data, and acquires a structure (for example, structure such as a table or a column) of each structured data (Step 1001).

Next, the structure analysis section 152 compares the acquired structure of each structured data with a structure such as a table or a column in a corresponding structured data source based on the structure information table 420 and the constraint condition information table 490 (Step 1002).

Next, the structure analysis section 152 detects whether or not the structure such as the table or the column in the structured data source has been changed (Step 1003).

In a case of detecting that the structure such as the table or the column in the structured data source has been changed (Step 1003: YES) as a result of this Step 1003, the structure analysis section 152 extracts the structure such as the table or the column in the structured data source and a constraint condition corresponding to the structured data source, updates the structure information table 420 on the basis of the extracted structure such as the table or the column, and updates the constraint condition information table 490 on the basis of the extracted constraint condition (Step 1004), and moves the process to Step 1005. On the other hand, in a case of not detecting that the structure such as the table or the column in the structured data source has been changed (Step 1003: NO), the structure analysis section 152 moves the process to Step 1005.

In Step 1005, the unstructured data input section 153 refers to the unstructured data information table 430, locates a storage position of unstructured data to serve as teacher data (in other words, unstructured data corresponding to the entry with the teacher flag of "YES"), and acquires the unstructured data from the located storage position.

Next, the unstructured data detection section 154 and the natural language analysis section 155 execute a teacher data analysis process (refer to FIG. 12) (Step 1006). According to this teacher data analysis process, an analysis result of the latest teacher data is stored in the teacher data analysis result information table 440.

Next, the synonym search section 252 of the synonym generation server 2 extracts synonyms related to predetermined nouns and a word (belonging relationship words such as a case particle) indicating a subordination between the nouns from one or more teacher data, and registers the synonyms and the belonging relationship word in the synonym information table 450 (Step 1007). As a synonym extraction method, an existing synonym extraction technique, for example, a technique for extracting synonyms on the basis of appearance positions or appearance probabilities of words or a co-occurrence degree of the words can be used.

Next, the extended synonym generation section 253 generates an extended synonym by executing a synonym combination process (refer to FIGS. 13A-13C) and stores the extended synonym in the extended synonym information table 460 (Step 1008), and ends the process.

Next, the teacher data analysis process will be described.

Figure 12:
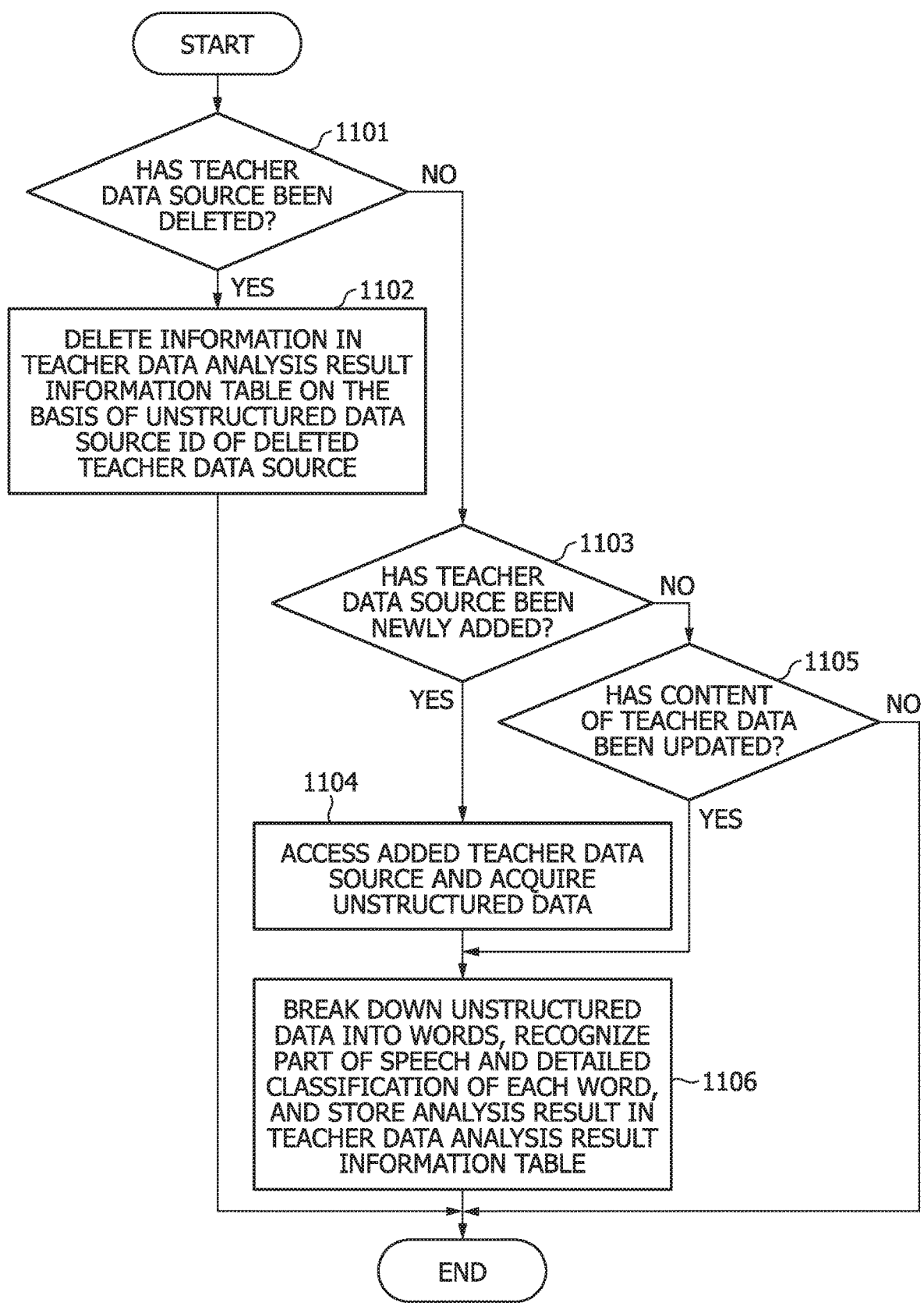
FIG. 12 is a flowchart of a teacher data analysis process according to the embodiment.

FIG. 12 is a flowchart of the teacher data analysis process according to the embodiment.

The teacher data analysis process is a process corresponding to Step 1006 of the extended synonym information generation process depicted in FIG. 11.

First, the unstructured data detection section 154 of the data collection/analysis server 1 detects whether or not a teacher data source has been deleted (Step 1101). Here, whether or not the teacher data source has been deleted can be grasped, for example, by non-presence of unstructured data at a position corresponding to position information in the unstructured data 432 column in an entry with "YES" in the teacher flag 436 column in the unstructured data information table 430.

In a case of detecting that the teacher data source has been deleted (Step 1101: YES) as a result of this Step 1101, the unstructured data detection section 154 deletes all entries corresponding to the deleted teacher data source in the teacher data analysis result information table 440 on the basis of the unstructured data source ID corresponding to the deleted teacher data source (Step 1102), and ends the process.

On the other hand, in a case of detecting that the teacher data source has not been deleted (Step 1101: NO), the unstructured data detection section 154 detects whether or not a teacher data source has been newly added (Step 1103). Here, whether or not a teacher data source has been newly added can be grasped, for example, by whether or not the entry with "YES" in the teacher flag 436 column in the unstructured data information table 430 is an entry added after a previous process.

In a case of detecting that a teacher data source has been newly added (Step 1103: YES) as a result of this Step 1103, the unstructured data detection section 154 accesses the added teacher data source and acquires newly added teacher data (Step 1104), and moves the process to Step 1106.

On the other hand, in a case of not detecting that a teacher data source has been newly added (Step 1103: NO), the unstructured data detection section 154 detects whether or not a content of the teacher data source has been updated (Step 1105). Here, whether or not a content of the teacher data source has been updated can be grasped, for example, by whether or not update date and time of the teacher data source is date and time after the previous process.

In a case of detecting that a content of the teacher data source has been updated (Step 1105: YES) as a result of this Step 1105, the unstructured data detection section 154 moves the process to Step 1106. On the other hand, in a case of not detecting that a content of the teacher data source has been updated (Step 1105: NO), the unstructured data detection section 154 ends the process.

In Step 1106, the natural language analysis section 155 breaks down the added teacher data or the updated teacher data into words by performing a morpheme analysis on the teacher data, analyzes a part of speech and a detailed classification of each of the words, stores an analysis result in the teacher data analysis result information table 440, and ends the process.

Next, the synonym combination process will be described.

Figure 13A:
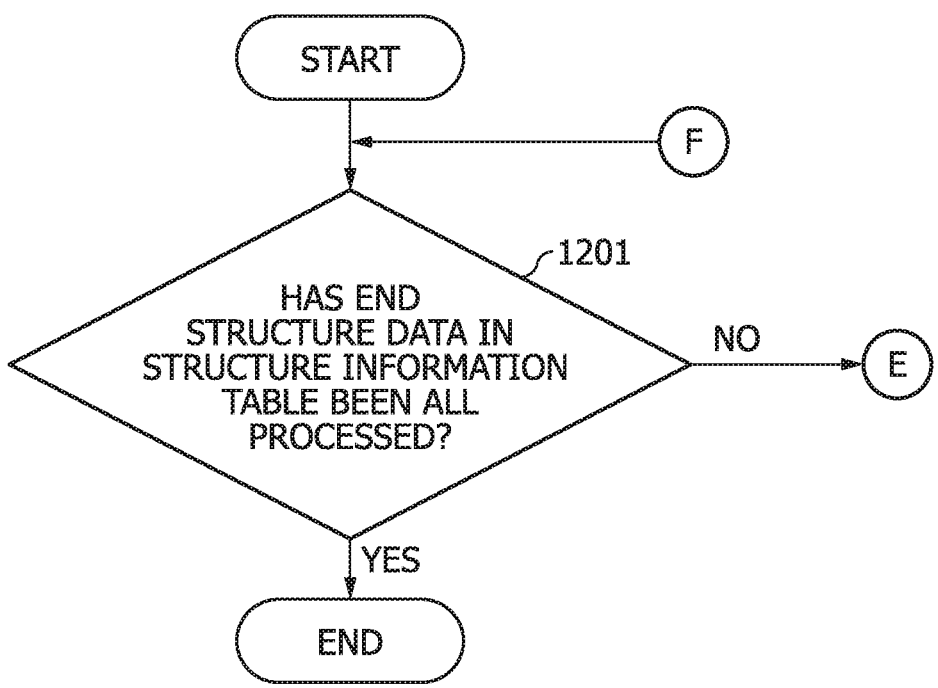
FIGS. 13A-13C are flowcharts of a synonym combination process according to the embodiments.
Figure 13B:
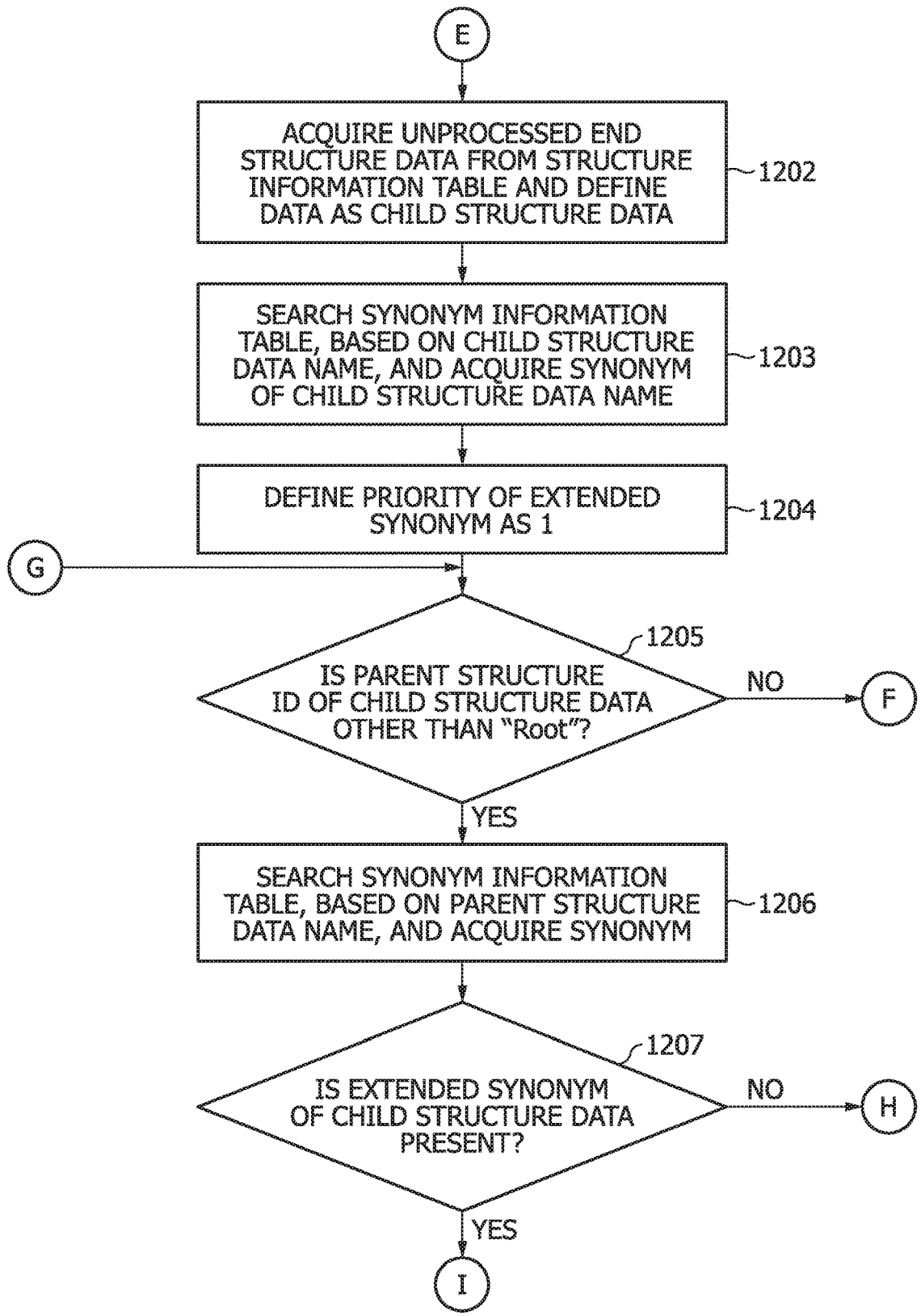
Figure 13C:
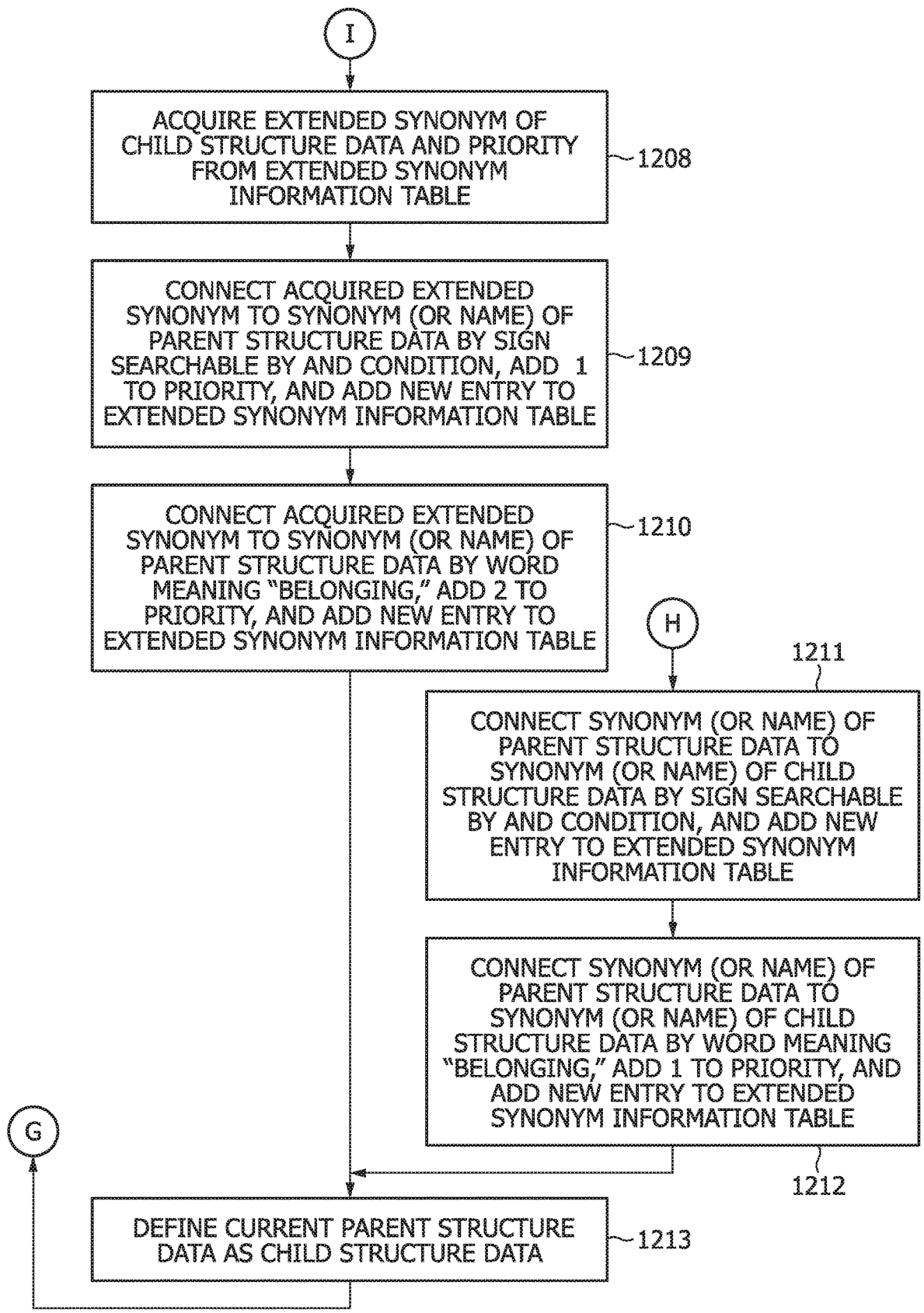

FIGS. 13A-13C are flowcharts of the synonym combination process according to the embodiments.

The synonym combination process is a process corresponding to Step 1008 of the extended synonym information generation process depicted in FIG. 11.

The extended synonym generation section 253 of the synonym generation server 2 determines whether or not data regarding end (bottom layer) structures (hereinafter, referred to as "end structure data") in the structure information table 420 has been all processed (Step 1201).

In a case in which end structure data has been all processed (Step 1201: YES) as a result of this Step 1201, this means that generation of extended synonyms is over and the extended synonym generation section 253, therefore, ends the process. On the other hand, in a case in which end structure data has not been all processed (Step 1201: NO), the extended synonym generation section 253 acquires unprocessed end structure data from the structure information table 420 and defines this data as "child structure data" (Step 1202).

Next, the extended synonym generation section 253 searches the synonym information table 450 on the basis of a name of a child structure corresponding to the child structure data and acquires a synonym of the name of the child structure (Step 1203).

Next, the extended synonym generation section 253 defines a priority of the extended synonym as "1" (Step 1204).

Next, the extended synonym generation section 253 determines whether or not a parent structure ID of the child structure corresponding to the child structure data is other than "Root" (Step 1205).

In a case in which the parent structure ID is not other than "Root," that is, the parent structure ID is "Root" (Step 1205: NO) as a result of this Step 1205, this means that an extended synonym based on the end structure to an uppermost structure has been generated and the extended synonym generation section 253, therefore, moves the process to Step 1201.

On the other hand, in a case in which the parent structure ID is other than "Root" (Step 1205: YES), the extended synonym generation section 253 searches the synonym information table 450 on the basis of a name of data regarding a structure indicated by the parent structure ID (hereinafter, referred to as "parent structure data") and acquires a synonym (Step 1206).

Next, the extended synonym generation section 253 refers to the extended synonym information table 460 and determines whether or not an extended synonym of the child structure corresponding to the child structure data is present (Step 1207).

In a case of determining that an extended synonym of the child structure corresponding to the child structure data is present (Step 1207: YES) as a result of this Step 1207, the extended synonym generation section 253 acquires the extended synonym and the priority from the extended synonym information table 460 (Step 1208).

Next, the extended synonym generation section 253 generates a new extended synonym by connecting the acquired extended synonym to the synonym (or name) of the parent structure data by a sign searchable by an AND condition (AND condition sign, for example, "&"), adds 1 to the acquired priority, and adds a new entry containing the generated extended synonym and the priority after addition to the extended synonym information table 460 (Step 1209). In the present embodiment, the extended synonym generation section 253 generates an extended synonym by connecting the acquired extended synonym to the synonym of the parent structure data by the AND condition sign and an extended synonym by connecting the acquired extended synonym to the name of the parent structure data by the AND condition sign. Alternatively, in a case in which a plurality of extended synonyms are acquired and a plurality of synonyms of the parent structure data are present, the extended synonym generation section 253 may generate extended synonyms by combining each of the plurality of extended synonyms with each of the plurality of synonyms in a similar manner described above.

Next, the extended synonym generation section 253 generates a new extended synonym by connecting the extended synonym acquired in Step 1208 to the synonym (or name) of the parent structure data by a word having a meaning of "belonging" (for example, "of," "belonging to," "regarding," or "out of"), adds 2 to the acquired priority, and adds a new entry containing the generated extended synonym and the priority after addition to the extended synonym information table 460 (Step 1210), and moves the process to Step 1213. In the present embodiment, the extended synonym generation section 253 generates an extended synonym by connecting the acquired extended synonym to the synonym of the parent structure data by the word having the meaning of "belonging" and an extended synonym by connecting the acquired extended synonym to the name of the parent structure data by the word having the meaning of "belonging." Alternatively, in a case in which the plurality of extended synonyms are acquired and the plurality of synonyms of the parent structure data are present, the extended synonym generation section 253 may generate extended synonyms by combining each of the plurality of extended synonyms with each of the plurality of synonyms in a similar manner described above. Furthermore, in the present embodiment, a case particle acquired as the synonym from the teacher data is used as the word having the meaning of "belonging." In a case in which a plurality of words having the meaning of "belonging" are present, the extended synonyms may be generated using each of the plurality of words.

On the other hand, in a case of determining that an extended synonym of the child structure corresponding to the child structure data is not present (Step 1207: NO), the extended synonym generation section 253 generates a new extended synonym by connecting the synonym (or name) of the parent structure data to the synonym (or name) of the child structure data by the AND condition sign, and adds a new entry containing the new extended synonym and the priority to the extended synonym information table 460 (Step 1211). In the present embodiment, the extended synonym generation section 253 generates an extended synonym by connecting the synonym of the parent structure data to the synonym of the child structure data by the AND condition sign, an extended synonym by connecting the name of the parent structure data to the synonym of the child structure data by the AND condition sign, an extended synonym by connecting the synonym of the parent structure data to the name of the child structure data by the AND condition sign, and an extended synonym by connecting the name of the parent structure data to the name of the child structure data by the AND condition sign. Alternatively, in a case in which a plurality of synonyms of the parent structure data and a plurality of synonyms of the child structure data are present, the extended synonym generation section 253 may generate extended synonyms by using each of the plurality of synonyms of the parent structure data and each of the plurality of synonyms of the child structure data in a similar manner described above.

Next, the extended synonym generation section 253 generates a new extended synonym by connecting the extended synonym of the parent structure data to the synonym of the child structure data by the word having the meaning of "belonging," adds 1 to the acquired priority, and adds a new entry containing the generated extended synonym and the priority after addition to the extended synonym information table 460 (Step 1212), and moves the process to Step 1213.

In Step 1213, the extended synonym generation section 253 defines the current parent structure data as child structure data and moves the process to Step 1205.

According to this synonym combination process, the extended synonym suited for searching unstructured data regarding a subject indicated by a certain structure of structured data is stored in the extended synonym information table 460. Owing to this, using the extended synonym in the extended synonym information table 460 makes it possible to improve accuracy for the search.

Next, the search process will be described.

Figure 14A:
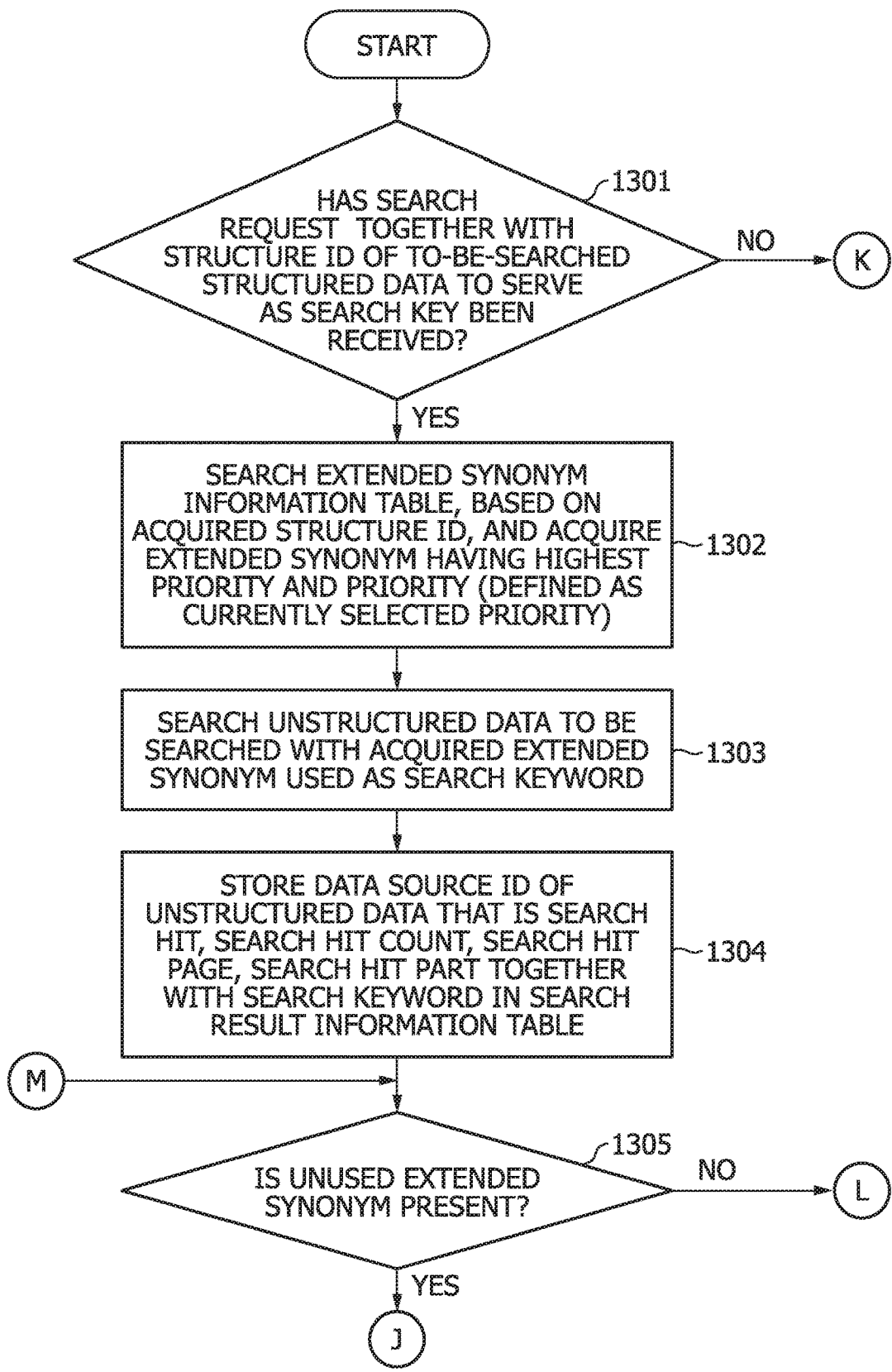
FIGS. 14A-14B are flowcharts of a search process according to the embodiments.
Figure 14B:
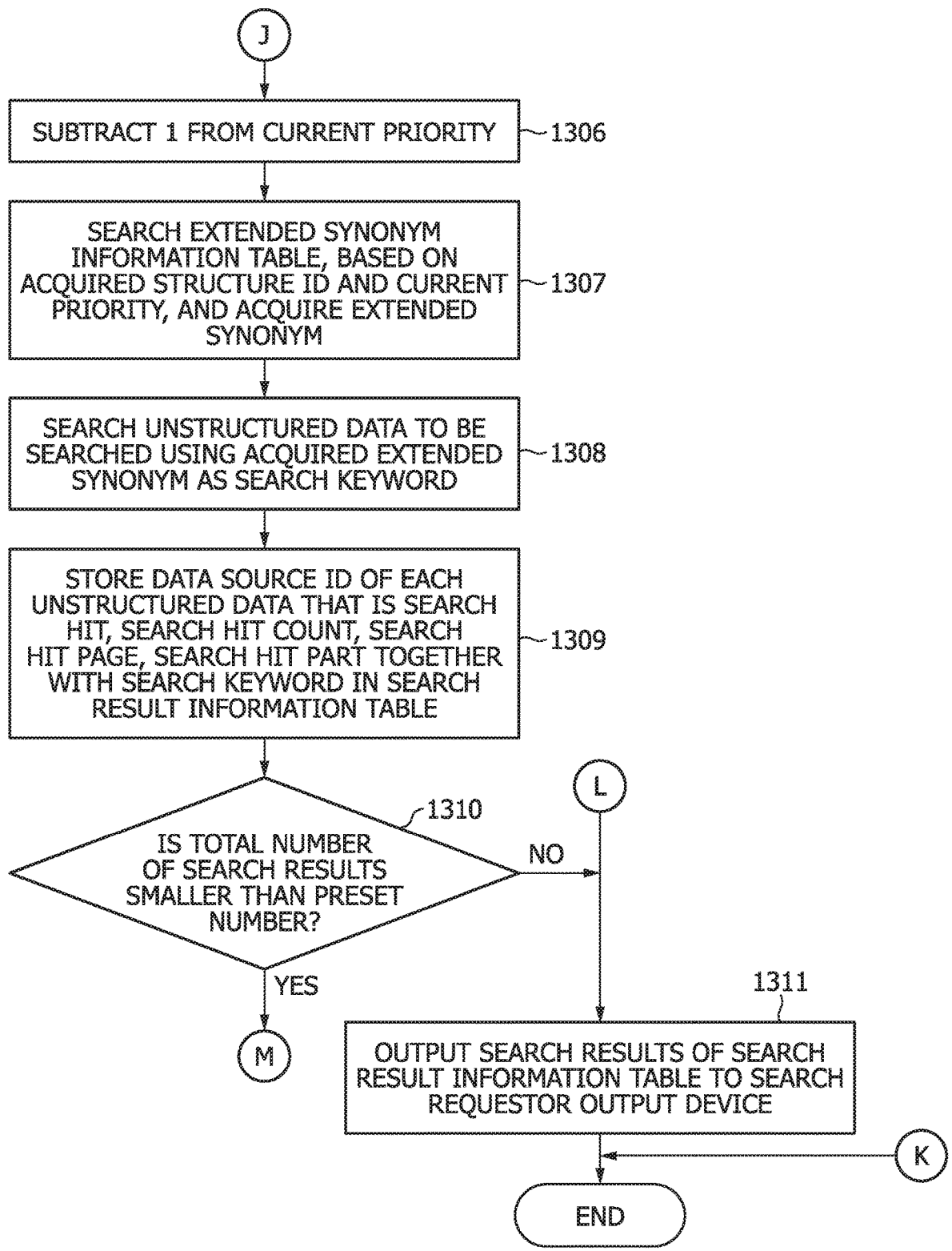

FIGS. 14A-14B are flowcharts of the search process according to the embodiments.

The search process is, for example, a process executed at regular intervals and performed to do a search using an extended synonym.

The data search section 352 determines whether or not a search request containing a structure ID of a structure of the to-be-searched structured data that is to serve as a search key has been received via the input device 31 or an external program of the client device 6 (Step 1301). In a case of determining that a search request has not been received (Step 1301: NO) as a result of this Step 1301, the data search section 352 ends the process.

On the other hand, in a case of determining that a search request has been received (Step 1301: YES), the data search section 352 searches the extended synonym information table 460 on the basis of the structure ID acquired as the search request, acquires an extended synonym having a highest priority and a priority of the extended synonym, and defines this priority as "currently selected priority" (Step 1302).

Next, the data search section 352 searches unstructured data using the acquired extended synonym as a search keyword (Step 1303). A range of the unstructured data to be searched may include unstructured data other than the teacher data registered in the unstructured data information table 430 or may include other unstructured data.

Next, the data search section 352 registers an entry containing a data source ID of unstructured data that is a search hit, a search hit count, a search hit page, a search hit part, and a search keyword in the search result information table 470 (Step 1304).

Next, the data search section 352 detects whether or not an unused extended synonym corresponding to the acquired structure ID is present in the extended synonym information table 460 (Step 1305).

In a case of detecting that an unused extended synonym is present (Step 1305: YES) as a result of this Step 1305, the data search section 352 subtracts 1 from the current priority (Step 1306), and acquires an extended synonym from the extended synonym information table 460 on the basis of the acquired structure ID and the current priority (Step 1307). On the other hand, in a case of detecting that an unused extended synonym is not present (Step 1305: NO), the data search section 352 moves the process to Step 1311.

Next, the data search section 352 searches unstructured data using the acquired extended synonym as a search keyword (Step 1308).

Next, the data search section 352 registers an entry containing a data source ID of each unstructured data that is a search hit, a search hit count, a search hit page, a search hit part, and a search keyword in the search result information table 470 (Step 1309).

Next, the data search section 352 determines whether or not a total number of search results is smaller than a preset number (Step 1310).

In a case in which the total number of search results is smaller than the preset number (Step 1310: YES) as a result of this Step 1310, the number is insufficient as search results and the data search section 352, therefore, moves the process to Step 1305. On the other hand, in a case in which the total number of search results is not smaller than the preset number (Step 1310: NO), the number is sufficient as search results and the data search section 352, therefore, moves the process to Step 1311. It is thereby possible to obtain as many search results equal to or greater than the predetermined number as possible.

In Step 1311, the search result output section 353 generates the extended synonym selection and search result confirmation interface screen 1700 (refer to FIG. 17) on the basis of the search results of the search result information table 470, and causes the extended synonym selection and search result confirmation interface screen 1700 to be displayed on a search requestor output device (for example, the output device 32 of the data search server 3 or an output device (not depicted) of the client device 6).

Next, an association degree change process will be described.

Figure 15:
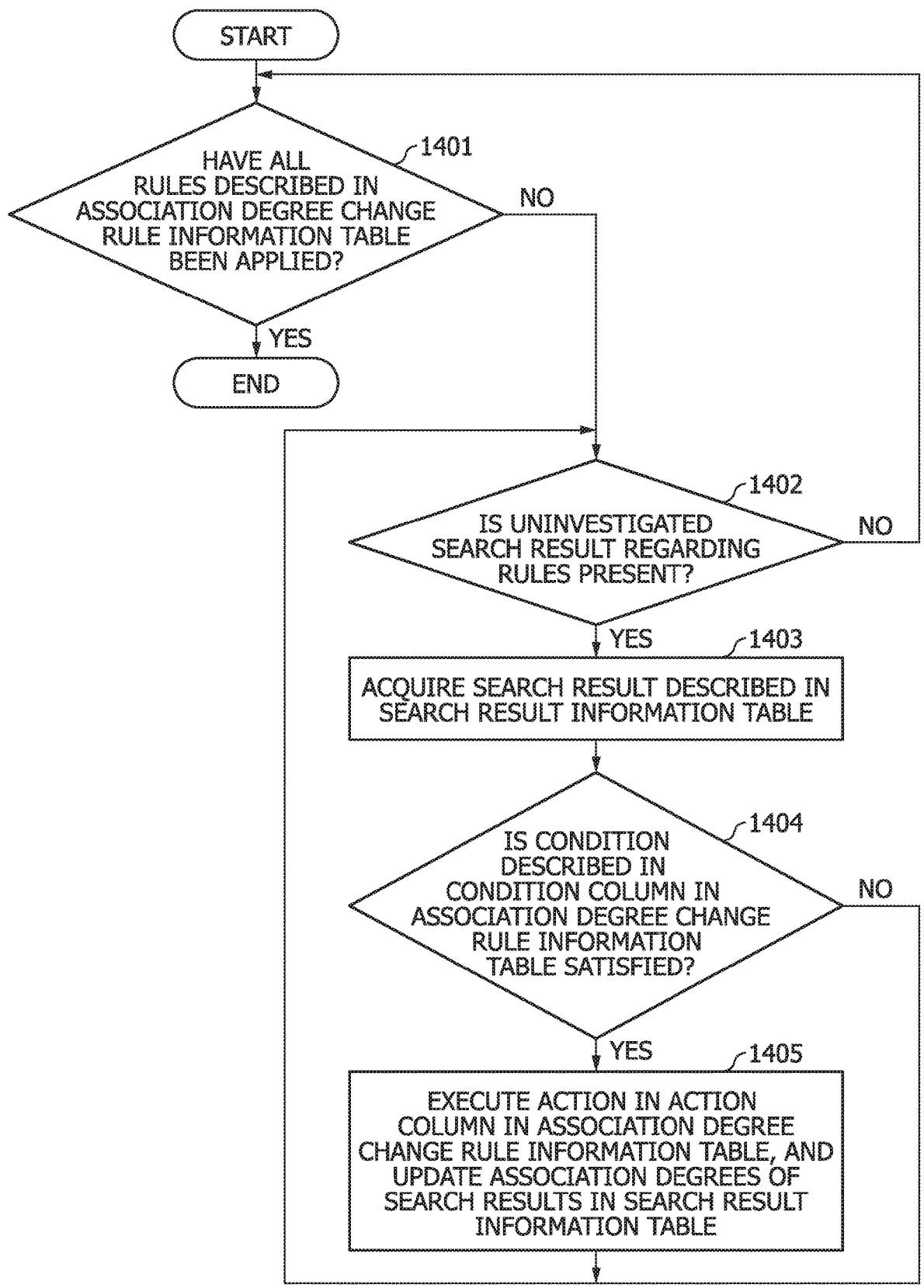
FIG. 15 is a flowchart of an association degree change process according to the embodiment.

FIG. 15 is a flowchart of the association degree change process according to the embodiment.

The association degree change process is executed in a case, for example, in which an instruction to change an applied rule is issued to the association degree change rule correction interface screen 1800 (refer to FIGS. 18A-18B) after the search process is executed.

The association degree change section 354 determines whether or not all of rules to be applied (with "Yes" in the applicability flag 482 columns) in the association degree change rule information table 480 have been applied (Step 1401).

In a case in which all of rules to be applied have not been applied (Step 1401: NO) as a result of this Step 1401, the association degree change section 354 moves the process to Step 1402. On the other hand, in a case in which all of rules to be applied have been applied (Step 1401: YES), the association degree change section 354 ends the association degree change process. It is noted that after end of the association degree change process, the association degree change section 354 changes a display order of search results on the basis of updated association degrees on the association degree change rule correction interface screen 1800 (refer to FIGS. 18A-18B), and displays the updated association degrees.

In Step 1402, the association degree change section 354 determines whether or not an uninvestigated search result regarding the rules to be applied (subject rules) is present. In a case in which an uninvestigated search result is not present (Step 1402: NO), the association degree change section 354 moves the process to Step 1401. On the other hand, in a case in which an uninvestigated search result is present (Step 1402: YES), the association degree change section 354 moves the process to Step 1403.

In Step 1403, the association degree change section 354 acquires the uninvestigated search result from the search result information table 470.

Next, the association degree change section 354 determines whether or not the acquired search result satisfies the condition stored in the condition 483 column in the entry corresponding to the subject rule in the association degree change rule information table 480 (Step 1404).

In a case in which the search result satisfies the condition (Step 1404: YES) as a result of this Step 1404, the association degree change section 354 executes an action stored in the action 484 column in the corresponding entry in the association degree change rule information table 480, and updates the association degrees of the entries corresponding to the search result in the search result information table 470 (Step 1405), and moves the process to Step 1402. On the other hand, in a case in which the search result does not satisfy the condition (Step 1404: NO), the association degree change section 354 moves the process to Step 1402.

According to the association degree change process, it is possible to appropriately calculate each association degree in accordance with the changed rule for the search results and change the display order of the search results in response to the calculated association degrees.

A search word designation/synonym correction interface screen will next be described.

FIG. 16 is the search word designation/synonym correction interface screen according to the embodiment.

The search word designation/synonym correction interface screen (which is an example of a synonym correction screen) 1600 is displayed on the output device 22 of the synonym generation server 2, the output device of the client device 6, or the like by the synonym search section 252 in a case, for example, in which a user issues an instruction to designate a search word or to correct a synonym. The synonym search section 252 is an example of a synonym correction screen output section.

On the search word designation/synonym correction interface screen 1600, a teacher data designation region 1601 for designating teacher data subjected to synonym correction or the like, a change button 1602 for receiving designation of change of the teacher data, a synonym display region 1603 for displaying synonyms searched from the teacher data and determining a synonym to be used, a register button 1604 for receiving registration of the synonyms in the synonym display region 1603, and a cancel button 1605 for receiving cancellation of the registration of a synonym are displayed.

One or more synonym content rows 1610 each indicating a content of each synonym are displayed in the synonym display region 1603. Data, a part of speech, and a synonym of a word as well as a delete button 1611 for receiving deletion of a content row are displayed in each synonym content row 1610. In addition, an add button 1612 for receiving addition of a new synonym content row 1610 is displayed in the synonym display region 1603.

When teacher data is designated in the teacher data designation region 1601 and the change button 1602 is depressed on the search word designation/synonym correction interface screen 1600, the synonym search section 252 causes synonyms corresponding to the teacher data designated in the teacher data designation region 1601 to be displayed in the synonym display region 1603.

In addition, when the delete button 1611 is depressed, the synonym search section 252 deletes a corresponding synonym content row 1610 from the synonym display region 1603. Furthermore, when the add button 1612 is depressed, the synonym search section 252 causes a new synonym content row 1610 to be displayed in the synonym display region 1603 and receives an input of data, a part of speech, and a synonym. When the register button 1604 is depressed, the synonym search section 252 reflects a content of the synonym display region 1603 in the synonym information table 450.

FIG. 17 depicts the extended synonym selection and search result confirmation interface screen according to the embodiment.

The extended synonym selection and search result confirmation interface screen (which is an example of an extended synonym reception screen) 1700 is displayed on the output device 32 of the data search server 3, the output device of the client device 6, or the like by the data search section 352 and the search result output section 353 in a case, for example, in which the user issues a search request. The data search section 352 and the search result output section 353 are an example of an extended synonym reception screen output section.

On the extended synonym selection and search result confirmation interface screen 1700, a to-be-searched structured data selection region 1701 for selecting a structure of structured data to be searched (to-be-searched structured data) that is a subject for which associated information is searched, an extended synonym list display region 1702 for displaying an extended synonym list, and a search result display region 1710 are displayed.

The extended synonym list display region 1702 contains an extended synonym content row 1703 corresponding to each extended synonym. An extended synonym, a priority of the extended synonym, and a select/not select check box 1704 indicating whether or not to select the extended synonym as a keyword in a search are displayed in each extended synonym content row 1703. The data search section 352 executes a search using the extended synonym for which the select/not select check box 1704 is checked in each extended synonym content row 1703 as a keyword, and causes a search result to be displayed in the search result display region 1710.

Information indicating unstructured data searched using the extended synonyms and a content of each unstructured data are displayed in the search result display region 1710. In the content of the unstructured data, a part corresponding to each extended synonym is displayed in such a manner as to be distinguishable from other parts (for example, in boldface type).

Figure 18A:
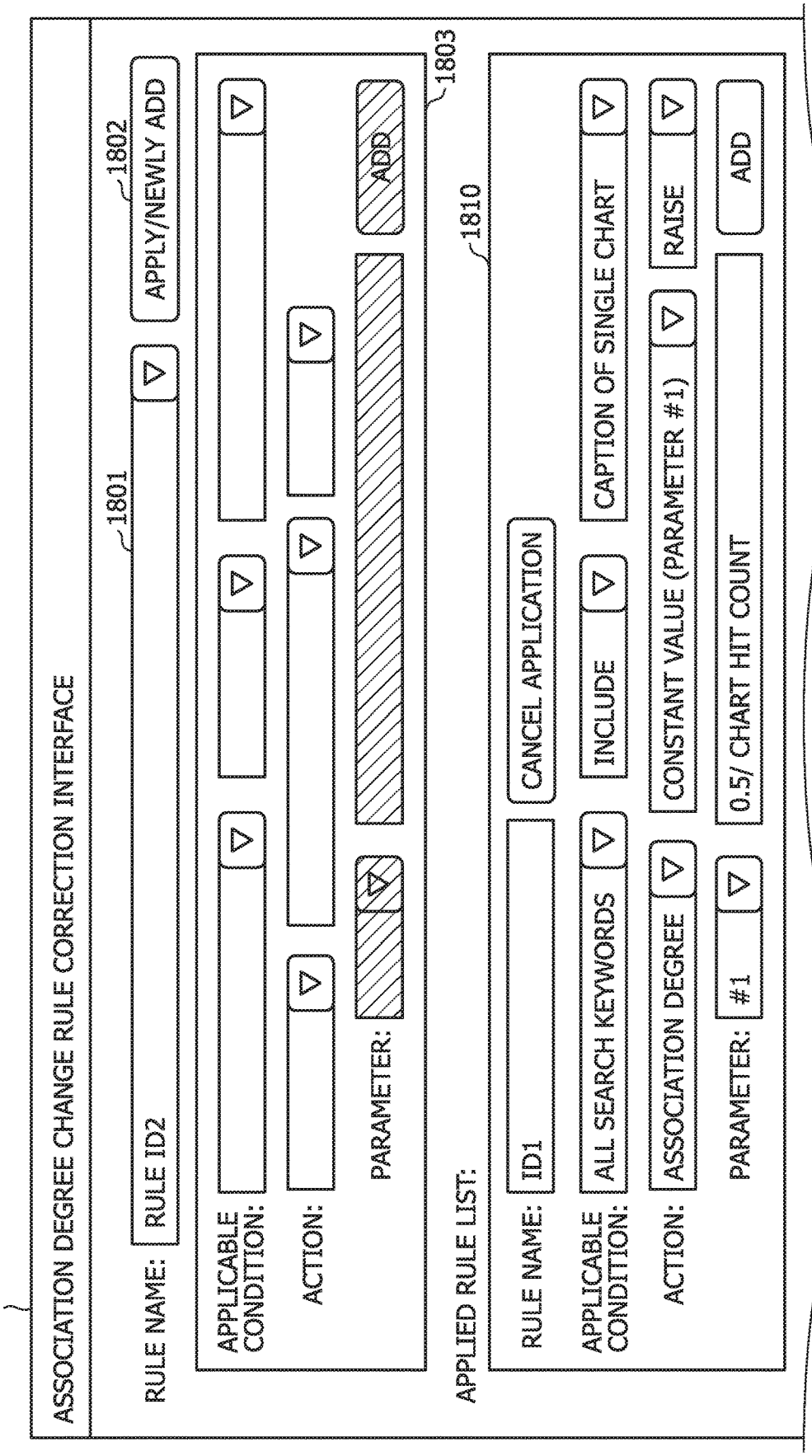

FIGS. 18A-18B depict the association degree change rule correction interface screen according to the embodiments.

The association degree change rule correction interface screen (which is an example of an association degree rule change reception screen) 1800 is a screen displayed for changing a calculation rule of an association degree of each search result in response to a user's instruction. The association degree change rule correction interface screen 1800 is displayed on the output device 32 of the data search server 3, the output device of the client device 6, or the like by the association degree change section 354. The association degree change section 354 is an example of a rule change screen output section.

On the association degree change rule correction interface screen 1800, a rule name input region 1801 for inputting a new rule name or selecting an existing rule to be applied, an apply/newly add button 1802 for receiving an instruction to apply a rule or to newly add a rule, a setting input region 1803 for setting a content of the new rule or the rule to be applied, an applied rule display region 1810 for displaying a list of already applied rules, and a search result display region 1820 are displayed. In the search result display region 1820, unstructured data as search results is displayed in descending order of the association degrees determined on the basis of the applied rule.

On the association degree change rule correction interface screen 1800, when an existing rule name is input to the rule name input region 1801 and the apply/newly add button 1802 is depressed, the association degree change section 354 displays the setting input region 1803 in which setting of a corresponding rule can be made, receives a content which has been set in the setting input region 1803 as a newly applied rule, registers the newly applied rule in the association degree change rule information table 480, calculates the association degree of each search result on the basis of the received rule, and displays the unstructured data as the search results in an order based on the association degrees in the search result display region 1820.

According to this association degree change rule correction interface screen 1800, it is possible to appropriately change the rule used to calculate the association degrees and display the unstructured data as the search results arranged in an appropriate order of association degrees.

It is noted that the present invention is not limited to the embodiment described above and can be carried out by being appropriately modified in a range not departing from the purport of the present invention.

For example, the RDB data or the data in the CSV format has been referred to as the structured data in the embodiment described above. However, the present invention is not limited to the RDB data or the like and the structured data may be, for example, a table data in spreadsheet software such as Excel (registered trademark). Examples of a structure of the table data in the spreadsheet software include a large category, an intermediate category, and a small category of a table.

Furthermore, the extended synonyms using connection by the AND condition and the extended synonyms using connection by the word having the meaning of belonging are generated as extended synonyms in the embodiment. However, the present invention is limited to such extended synonyms and the extended synonyms of any one of the types may be generated.

Moreover, the data search server 3 is provided within the search support system 100 in the embodiment described above. However, the present invention is not limited to the configuration and unstructured data may be searched using a search function of an external search server outside of the search support system 100 and the search support system 100 may acquire search results of the search function.

Moreover, a dedicated hardware circuit may execute part or all of the processes performed by the CPUs 14, 24, and 34 in the embodiment described above. Furthermore, the programs in the embodiment may be installed from a program source. The program source may be a program distribution server or a storage medium (for example, a transportable non-transitory storage medium).

What is claimed is:

1. A search support system supporting a search of unstructured data associated with a subject name that is a name of a subject indicated by a predetermined structure in structured data which contains a plurality of structures having a hierarchical relationship, comprising:
   at least one storage device; and
   at least one processor configured to:
   extract a set of synonyms from teacher data which is unstructured data for detecting synonyms of the subject name; and
   generate an extended synonym which is a phrase obtained by combining a first subject name of a first structure in the structured data or a first synonym which is a synonym of the first subject name and which is extracted by the at least one processor with one or more second subject names indicated by one or more second structures higher in order than the first structure or second synonyms which are synonyms of the one or more second subject names and which are extracted by the processor; and
   store the extended synonym in the at least one storage device.

2. The search support system according to claim 1, wherein
   the at least one processor is further configured to:
   extract a belonging relationship word that is a synonym of a word indicating a belonging relationship from the teacher data, and
   generate the extended synonym by combining the first subject name of the first structure in the structured data or the first synonym which is the synonym of the first subject name and which is extracted by the at least one processor with the one or more second subject names indicated by the one or more second structures higher in order than the first structure or the second synonyms which are the synonyms of the one or more second subject names and which are extracted by the at least one processor, via the belonging relationship word.

3. The search support system according to claim 2, wherein
   the belonging relationship word is a case particle.

4. The search support system according to claim 1, wherein
   the at least one processor is further configured to:
   generate the extended synonym by connecting the first subject name of the first structure in the structured data or the first synonym which is the synonym of the first subject name and which is extracted by the at least one processor with the one or more second subject names indicated by the one or more second structures higher in order than the first structure or the second synonyms which are the synonyms of the one or more second subject names and which are extracted by the at least one processor, by a sign searchable by an AND condition in a predetermined search server.

5. The search support system according to claim 1, wherein the at least one processor is further configured to:
   identify an extended synonym used to search unstructured data associated with the subject name indicated by a structure to be searched from among a plurality of extended synonyms stored in the at least one storage device, and search the unstructured data using the identified extended synonym as a search keyword.

6. The search support system according to claim 5, wherein the at least one processor is further configured to:
   control to display an extended synonym reception screen for displaying a plurality of extended synonyms which can be used to search the unstructured data associated with the subject name indicated by the structure to be searched among the plurality of extended synonyms stored in the at least one storage device, and for receiving selection of the extended synonym to be used from among the displayed plurality of extended synonyms; and
   search the unstructured data using the extended synonym selected on the extended synonym reception screen as the search keyword.

7. The search support system according to claim 5, wherein the at least one processor is further configured to:
   acquire extended synonyms with higher priorities used to search the unstructured data from among the plurality of extended synonyms stored in the at least one storage device until a total number of unstructured data as search results obtained by the search becomes equal to or greater than a predetermined number; and
   search the unstructured data using the acquired extended synonyms as search keywords.

8. The search support system according to claim 5,
   wherein at least one storage device stores an association degree rule for determining an association degree of one or more unstructured data as the search results with a subject to be searched; and
   wherein the at least one processor is further configured to determine the association degrees of the unstructured data as the search results on the basis of the association degree rule, and control to display the unstructured data in an order according to the determined association degrees.

9. The search support system according to claim 8, wherein the at least one processor is further configured to:

control to display an association degree rule change reception screen for receiving change of the association degree rule; and change the association degrees of the unstructured data as the search results by the association degree rule changed on the association degree rule change reception screen.

10. The search support system according to claim 8, wherein the at least one storage device stores a constraint condition regarding a value of the subject indicated by the structure of the structured data, and wherein the association degree rule is a rule that determines each association degree on the basis of the number of numeric values satisfying the constraint condition in the search results.

11. The search support system according to claim 1, wherein the at least one processor is further configured to:

control to display a synonym correction screen for displaying the set of synonyms extracted by the at least one processor and for receiving at least either addition of a new set of synonyms or deletion of the displayed set of synonyms; and generate the extended synonym using a set of synonyms corrected on the basis of a content received on the synonym correction screen.

12. A search support method by a search support system supporting a search of unstructured data associated with a subject name that is a name of a subject indicated by a predetermined structure configuring structured data, the search support method comprising the steps of:

extracting, by the search support system, a set of synonyms from teacher data which is unstructured data for detecting synonyms of the subject name;

generating, by the search support system, an extended synonym which is a phrase obtained by combining a first subject name of a first structure in the structured data or a first synonym which is a synonym of the first subject name and which is extracted by the step of extracting with one or more second subject names indicated by one or more second structures higher in order than the first structure or second synonyms which are synonyms of the one or more second subject names and which are extracted by the step of extracting; and storing, by the search support system, the extended synonym in a storage device.

13. A non-transitory computer readable storage medium storing thereon a search support program executed by a computer configuring a search support system supporting a search of unstructured data associated with a subject name that is a name of a subject indicated by a predetermined structure configuring structured data, the search support program causing the computer to;

extract a set of synonyms from teacher data which is unstructured data for detecting synonyms of the subject name;

generate an extended synonym which is a phrase obtained by combining a first subject name of a first structure in the structured data or a first synonym which is a synonym of the first subject name and which is extracted by the computer with one or more second subject names indicated by one or more second structures higher in order than the first structure or second synonyms which are synonyms of the one or more second subject names and which are extracted by the computer; and store the extended synonym in a storage device.

* * * * *